US012626007B2

(12) United States Patent
Huang et al.

(10) Patent No.: US 12,626,007 B2
(45) Date of Patent: May 12, 2026

(54) POSITIONING METHOD AND RELATED APPARATUS

(71) Applicant: HUAWEI TECHNOLOGIES CO., LTD., Guangdong (CN)

(72) Inventors: Guosheng Huang, Shanghai (CN); Yongxiang Liu, Shanghai (CN); Xiang Shi, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 380 days.

(21) Appl. No.: 18/249,967

(22) PCT Filed: Oct. 21, 2021

(86) PCT No.: PCT/CN2021/125238
§ 371 (c)(1),
(2) Date: Apr. 20, 2023

(87) PCT Pub. No.: WO2022/083680
PCT Pub. Date: Apr. 28, 2022

(65) Prior Publication Data
US 2023/0400592 A1 Dec. 14, 2023

(30) Foreign Application Priority Data

Oct. 22, 2020 (CN) .......................... 202011141757.4
Jan. 30, 2021 (CN) .......................... 202110131917.5

(51) Int. Cl.
*G06F 21/62* (2013.01)
*G06F 9/54* (2006.01)
(Continued)

(52) U.S. Cl.
CPC .......... *G06F 21/6245* (2013.01); *G06F 9/546* (2013.01); *G01S 19/41* (2013.01); *G01S 19/426* (2013.01); *G01S 19/43* (2013.01)

(58) Field of Classification Search
CPC ....... G06F 21/6245; G06F 21/54; G06F 9/546
See application file for complete search history.

(56) References Cited

U.S. PATENT DOCUMENTS 6,463,474 B1 * 10/2002 Fuh ..................... H04L 63/0227
709/225
2011/0307138 A1 * 12/2011 Kellar ..................... G01S 19/42
701/469
(Continued)

FOREIGN PATENT DOCUMENTS

CN 105493587 A 4/2016
CN 105718807 A * 6/2016 ............. G06F 21/51
(Continued)

OTHER PUBLICATIONS

Novatel, RealTime Kinematic (RTK), in An Introduction to GNSS: GPS, GLONASS, Galileo and other Global Navigation Satellite Systems, Chapter 5: Resolving Errors, p. 1 and 3 (Year: 2017).*

*Primary Examiner* — Robert W Hodge
*Assistant Examiner* — Fred H Mull

(57) ABSTRACT

Positioning method and apparatus provide two services: a first, common positioning service and a second, high-precision positioning service to an upper-layer application through permission control and an independent reporting channel design. For a common application, a positioning result can be reported with a first, common precision through a common reporting channel. For a high-precision application, a positioning result with a higher level of precision can be reported through a high-precision reporting channel. In this way, the channel for obtaining the positioning result by the common application is isolated from the channel for obtaining the positioning result by the high-precision application, thus improving output security of the high-precision (Continued)

positioning result and satisfying security requirements of different countries or regions.

18 Claims, 15 Drawing Sheets

(51) Int. Cl.
*G01S 19/41* (2010.01)
*G01S 19/42* (2010.01)
*G01S 19/43* (2010.01)

(56) References Cited

U.S. PATENT DOCUMENTS

| | | | |
|---|---|---|---|
| 2014/0005939 A1 | 1/2014 | Schatzberg et al. | |
| 2016/0150361 A1* | 5/2016 | Zhu | G06F 21/6245 |
| | | | 455/456.1 |
| 2018/0020329 A1* | 1/2018 | Smith | H04W 4/08 |
| 2018/0095478 A1* | 4/2018 | van Cruyningen | G01S 19/14 |
| 2018/0285172 A1* | 10/2018 | Turner | G06F 21/606 |
| 2022/0408399 A1* | 12/2022 | He | G01S 19/073 |

FOREIGN PATENT DOCUMENTS

| | | | | |
|---|---|---|---|---|
| CN | 106973150 A | | 7/2017 | |
| CN | 107704276 A | | 2/2018 | |
| CN | 110366233 A | | 10/2019 | |
| CN | 110426723 A | * | 11/2019 | G01S 19/42 |
| CN | 111060123 A | * | 4/2020 | G01C 21/3629 |
| CN | 111541719 A | * | 8/2020 | H04L 63/0884 |
| KR | 20170022766 A | * | 3/2017 | G01S 19/01 |

* cited by examiner

POSITIONING METHOD AND RELATED APPARATUS

This application is a national stage of International Application No. PCT/CN2021/125238 filed on Oct. 21, 2021, which claims priority to Chinese Patent Application No. 202011141757.4 filed on Oct. 22, 2020 and Chinese Patent Application No. 202110131917.5 filed on Jan. 30, 2021. All of the aforementioned applications are hereby incorporated by reference in their entireties.

TECHNICAL FIELD

This application relates to the field of positioning technologies, and in particular, to a positioning method and a related apparatus.

BACKGROUND

In electronic devices represented by smartphones, a location based service (location based service, LBS) has become an indispensable basic service for obtaining an accurate user location.

Currently, the electronic devices such as smartphones use a global navigation satellite system (global navigation satellite system, GNSS) positioning technologies. For example, pseudorange single point positioning can usually achieve a precision of meters (for example, 3 m to 5 m), and satisfy basic positioning and navigation requirements, for example, road-level navigation, which is referred to as a common positioning service.

To further improve a GNSS positioning precision, assistance data needs to be introduced from a third-party base station, to correct a GNSS ephemeris error, an atmospheric error, and the like. For example, typical positioning technologies include a differential global navigation satellite system (differential navigation satellite system, DGNSS) technology based on differential positioning, a real-time kinematic (real-time kinematic, RTK) technology, and a precise point positioning (precise point positioning, PPP) technology based on error correction. Both the RTK technology and the PPP technology use carrier-phase measurement, and can achieve a precision of submeters (<1 m) to centimeters, so that lane information of a vehicle can be accurately identified, and a lane-level navigation requirement can be satisfied. This is referred to as a high-precision positioning service.

To ensure homeland security, a common unauthorized device (for example, a consumer electronic device such as a mobile phone) cannot directly output a high-precision positioning result in many countries or regions, so that the positioning result cannot be obtained and used by an unauthorized application.

SUMMARY

This application provides a positioning method and a related apparatus, to provide two services, namely a common positioning service and a high-precision positioning service, to an upper-layer application through permission control and an independent reporting channel design. In this way, a channel for obtaining a positioning result by a common application is isolated from a channel for obtaining a positioning result by a high-precision application. This can improve output security of the high-precision positioning result, satisfying security requirements of different countries or regions.

According to a first aspect, this application provides a positioning method, including: An electronic device obtains a first positioning instruction of a first application. The electronic device solves high-precision positioning coordinates in a first coordinate system in response to the first positioning instruction. The electronic device adds a deflection factor to the high-precision positioning coordinates, and performs encryption according to a preset encryption algorithm, to obtain encrypted deflection coordinates. The electronic device reports the encrypted deflection coordinates to the first application.

In the positioning method provided in this application, the electronic device may provide two services, namely a common positioning service and a high-precision positioning service, to an upper-layer application through permission control and an independent reporting channel design. For a common application, the electronic device may report a positioning result with a common precision (for example, a typical precision value of 3 m to 5 m) to the common application through a common reporting channel. For a high-precision application, after authentication succeeds in the high-precision application, the electronic device may report a positioning result with a high precision (for example, a typical precision value of less than 1 m) to the high-precision application through a high-precision reporting channel. This ensures that the channel for obtaining the positioning result by the common application is isolated from the channel for obtaining the positioning result by the high-precision application. This improves output security of the high-precision positioning result, satisfying security requirements of different countries or regions.

In a possible implementation, that the electronic device solves high-precision positioning coordinates in a first coordinate system specifically includes: The electronic device obtains first GNSS observation volume data by using a global navigation satellite system GNSS chip. The electronic device obtains positioning assistance data. The electronic device solves the high-precision positioning coordinates in the first coordinate system based on the first GNSS observation volume data and the positioning assistance data.

In a possible implementation, that the electronic device adds a deflection factor to the high-precision positioning coordinates, and performs encryption according to a preset encryption algorithm, to obtain encrypted deflection coordinates specifically includes: The electronic device adds the deflection factor to the high-precision positioning coordinates, to obtain high-precision deflection coordinates in a second coordinate system. The electronic device encrypts the high-precision deflection coordinates according to a preset encryption algorithm, to obtain the encrypted deflection coordinates.

The first coordinate system may be a world geodetic system WGS84 coordinate system, and the second coordinate system may be a GCJ02 coordinate system of the Chinese State Bureau of Surveying and Mapping. The preset encryption algorithm may include an SM4 Chinese encryption algorithm.

In a possible implementation, the method further includes: The electronic device obtains a second positioning instruction of a second application. The electronic device solves common positioning coordinates in the first coordinate system in response to the second positioning instruction. The electronic device reports the common positioning coordinates to the second application.

In a possible implementation, that the electronic device solves common positioning coordinates in the first coordinate system specifically includes: The electronic device obtains second GNSS observation volume data by using the GNSS chip. The electronic device solves the common positioning coordinates in the first coordinate system based on the second GNSS observation volume data.

In a possible implementation, the electronic device includes a high-precision positioning engine and a common positioning engine. That the electronic device solves high-precision positioning coordinates in a first coordinate system specifically includes: The electronic device solves the high-precision positioning coordinates in the first coordinate system by using the high-precision positioning engine. That the electronic device solves common positioning coordinates in the first coordinate system specifically includes: The electronic device solves the common positioning coordinates in the first coordinate system by using the common positioning engine.

In this way, different positioning engines are used to independently calculate the common positioning result and the high-precision positioning result, and perform coordinate conversion and encryption processing in a process of reporting the high-precision positioning result. This fully ensures output security of the high-precision positioning result.

In a possible implementation, the electronic device includes a positioning engine, and the positioning engine includes a high-precision positioning function and a common positioning function. That the electronic device solves high-precision positioning coordinates in a first coordinate system specifically includes: The electronic device enables the high-precision positioning function of the positioning engine, and solves the high-precision positioning coordinates in the first coordinate system by using the positioning engine. The method further includes: The electronic device obtains a second positioning instruction of a second application. When a time difference between a time point of obtaining the first positioning instruction and a time point of obtaining the second positioning instruction is less than preset duration, the electronic device adds a random error to the high-precision positioning coordinates, to obtain common positioning coordinates. A precision value of the common positioning coordinates is greater than a precision value of the high-precision positioning coordinates. The electronic device reports the common positioning coordinates to the second application.

In a possible implementation, the method further includes: When a time difference between the time point of obtaining the first positioning instruction and the time point of obtaining the second positioning instruction is greater than or equal to the preset duration, the electronic device enables the common positioning function of the positioning engine, and obtains second GNSS observation volume data by using the GNSS chip. The electronic device solves the common positioning coordinates by using the positioning engine based on the second GNSS observation volume data.

In this way, one positioning engine is used to separately calculate the common positioning result and the high-precision positioning result, and perform coordinate conversion and encryption processing in a process of reporting the high-precision positioning result to the high-precision application. When positioning instructions of the common application and the high-precision application are simultaneously obtained, the high-precision positioning result may be solved, and then coordinate conversion and encryption processing are performed in the process of reporting the high-precision positioning result to the high-precision application. In addition, the random error is added to the high-precision positioning result, and then the high-precision positioning result is reported to the common application. This ensures output security of high-precision result.

In a possible implementation, when the electronic device solves the high-precision positioning coordinates in the first coordinate system by using the positioning engine, the method further includes: The electronic device determines the positioning precision value of the high-precision positioning coordinates. The method further includes: When the time difference between the time point of obtaining the first positioning instruction and the time point of obtaining the second positioning instruction is less than the preset duration, and the positioning precision value of the high-precision positioning coordinates is less than a preset precision value, the electronic device adds a random error to the high-precision positioning coordinates, to obtain common positioning coordinates. The precision value of the common positioning coordinates is greater than the precision value of the high-precision positioning coordinates. When the time difference between the time point of obtaining the first positioning instruction and the time point of obtaining the second positioning instruction is less than the preset duration, and the positioning precision value of the high-precision positioning coordinates is greater than or equal to a preset precision value, the electronic device determines the high-precision positioning coordinates as the common positioning coordinates.

In this way: when the solved high-precision positioning result is not highly precise, the high-precision positioning result may be directly reported to the common application, reducing a time period for reporting the positioning result.

In a possible implementation, the first GNSS observation volume data includes a carrier phase observation volume and one or more of a pseudorange observation volume and a Doppler frequency observation volume. Before the electronic device obtains the positioning assistance data, the method further includes: The electronic device obtains a probability location based on the first GNSS observation volume data and sends the probability location to a server. That the electronic device obtains positioning assistance data specifically includes: The electronic device obtains the positioning assistance data that is determined by the server based on the probability location, and location information and observation volume data that are obtained during satellite observation by N reference stations. The positioning assistance data includes the observation volume data and the location information of the reference station. N is a positive integer. That the electronic device solves the high-precision positioning coordinates in the first coordinate system based on the first GNSS observation volume data and the positioning assistance data specifically includes: The electronic device solves the high-precision positioning coordinates in the first coordinate system through real-time kinematic RTK positioning based on the first GNSS observation volume data and the positioning assistance data.

In this way, high-precision positioning can be completed based on the RTK technology.

In a possible implementation, the first GNSS observation volume data includes a carrier phase observation volume and one or more of a pseudorange observation volume and a Doppler frequency observation volume. That the electronic device obtains positioning assistance data specifically includes: The electronic device receives the positioning assistance data played by a mobile communications base station or a satellite. The positioning assistance data includes one or more of a precise ephemeris, or ephemeris correction data, and an atmospheric correction quantity. That the electronic device solves the high-precision positioning coordinates in the first coordinate system based on the first GNSS observation volume data and the positioning assistance data specifically includes: The electronic device solves the high-precision positioning coordinates in the first coordinate system through precise point positioning PPP based on the first GNSS observation volume data and the positioning assistance data.

In this way, high-precision positioning can be completed based on the PPP technology.

In a possible implementation, the second GNSS observation volume data includes one or more of a pseudorange observation volume and a Doppler frequency observation volume.

In a possible implementation, after the electronic device obtains the first positioning instruction, the method further includes: The electronic device obtains inertial measurement data by using an inertial measurement unit. The inertial measurement data includes acceleration sensor data and gyro sensor data of the electronic device. That the electronic device solves the high-precision positioning coordinates in the first coordinate system based on the first GNSS observation volume data and the positioning assistance data specifically includes: The electronic device performs inertial navigation based on the first GNSS observation volume data, the positioning assistance data, and the inertial measurement data, to solve the high-precision positioning coordinates in the first coordinate system.

In this way, precision of the high-precision positioning result can be improved by combining the inertial navigation technology.

In a possible implementation, after the electronic device obtains the second positioning instruction, the method further includes: The electronic device obtains inertial measurement data by using an inertial measurement unit. The inertial measurement data includes acceleration sensor data and gyro sensor data of the electronic device. That the electronic device solves the common positioning coordinates in the first coordinate system based on the second GNSS observation volume data specifically includes: The electronic device performs inertial navigation based on the second GNSS observation volume data and the inertial measurement data, to solve the common positioning coordinates in the first coordinate system.

In this way, precision of the common positioning result can be improved by combining the inertial navigation technology.

In a possible implementation, after the electronic device reports the encrypted deflection coordinates to the first application, the method further includes: The electronic device decrypts the encrypted deflection coordinates by using a decryption key that is in the first application and that corresponds to the preset encryption algorithm, to obtain the high-precision deflection coordinates. The electronic device performs lane-level navigation by using a map resource package provided in the first application and the high-precision deflection coordinates.

In a possible implementation, that the electronic device obtains first GNSS observation volume data by using a GNSS chip specifically includes: The electronic device authenticates the first application. After the first application is successfully authenticated, the electronic device obtains the first GNSS observation volume data by using the GNSS chip.

In this way, before high-precision positioning is performed, the first application may be first authenticated, to ensure that the first application is an application that can be authorized to use the high-precision positioning result.

In a possible implementation, that the electronic device authenticates the first application specifically includes: The electronic device sends an authentication request to an authentication server. The authentication request includes an identifier of the first application. When the electronic device receives authentication success information sent by the authentication server, the electronic device successfully authenticates the first application.

In a possible implementation, that the electronic device authenticates the first application specifically includes: The electronic device determines whether a high-precision application whitelist includes an identifier of the first application. If the high-precision application whitelist includes the identifier of the first application, the electronic device successfully authenticates the first application. The high-precision application whitelist includes an identifier of one or more high-precision applications.

According to a second aspect, this application provides an electronic device, including one or more processors, a GNSS chip, and one or more memories. The one or more memories are coupled to the one or more processors. The one or more memories are configured to store computer program code. The computer program code includes computer instructions. When the one or more processors execute the computer instructions, the electronic device is enabled to perform the positioning method in any one of the possible implementations of the foregoing aspects.

According to a third aspect, this application provides a chip system, applied to an electronic device. The chip system includes an application processor and a GNSS chip. The chip system performs the positioning method according to any one of the possible implementations of any one of the foregoing aspects.

According to a fourth aspect, this application provides a computer storage medium, including computer instructions. When the computer instructions are run on an electronic device, the electronic device is enabled to perform the positioning method according to any possible implementation of any one of the foregoing aspects.

According to a fifth aspect, this application provides a computer program product. When the computer program product is run on a computer, the computer is enabled to perform the positioning method in any possible implementation of any one of the foregoing aspects.

According to a sixth aspect, this application provides an electronic device, including one or more function modules. The one or more function modules are configured to perform the positioning method in any one of the possible implementations of any one of the foregoing aspects.

DESCRIPTION OF EMBODIMENTS

The following clearly describes technical solutions in embodiments of this application in detail with reference to the accompanying drawings. In the descriptions of embodiments of this application, unless otherwise specified, "/" indicates "or". For example, A/B may indicate A or B. The term "and/or" in this specification only describes an association relationship for describing associated objects, and indicates that three relationships may exist. For example, A and/or B may indicate the following three cases: Only A exists, both A and B exist, and only B exists. In addition, in the descriptions of embodiments of this application, "a plurality of" means two or more.

The following terms "first" and "second" are only intended for a purpose of description, and should not be understood as an indication or implication of relative importance or implicit indication of a quantity of indicated technical features. Therefore, a feature limited by "first" or "second" may explicitly or implicitly include one or more features. In the descriptions of embodiments of this application, unless otherwise specified, "a plurality of" means two or more than two.

First, a schematic diagram of an architecture of a positioning system 10 according to an embodiment of this application is described.

Figure 1:
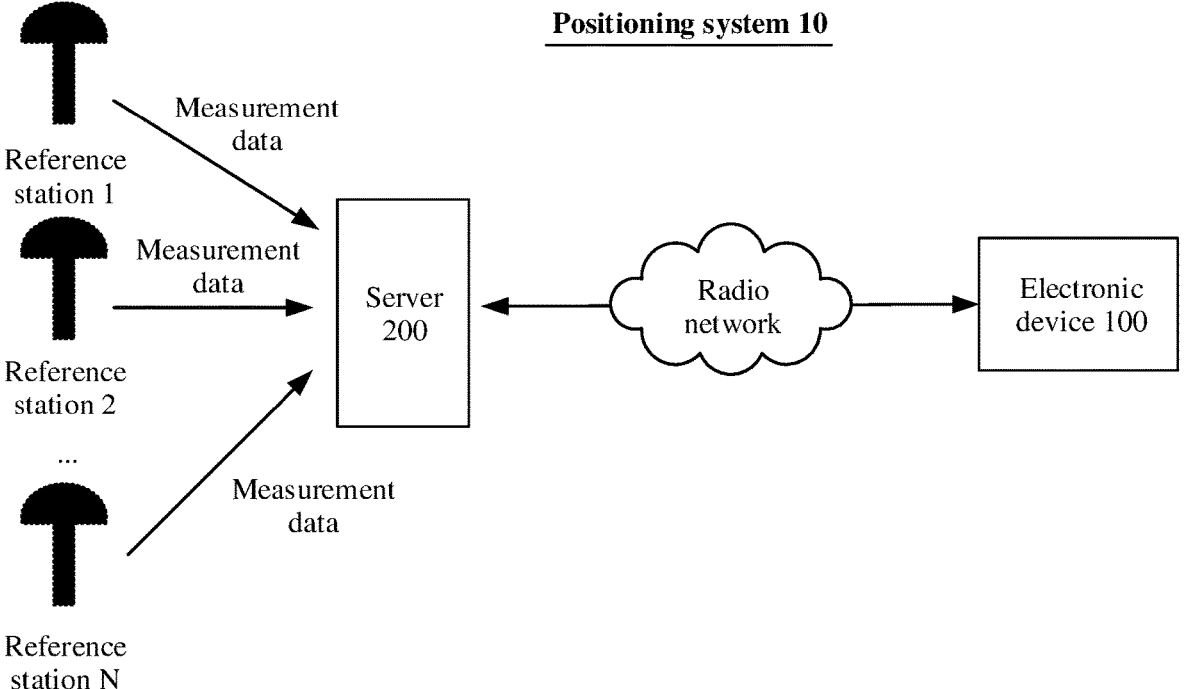
FIG. 1 is a schematic diagram of an architecture of a positioning system according to an embodiment of this application.

FIG. 1 is a schematic diagram of an architecture of a positioning system 10 according to an embodiment of this application. As shown in FIG. 1, the positioning system 10 includes N continuously operating reference stations (continuously operating reference stations, CORS) (reference stations for short), a server 200, and an electronic device 100. N is a positive integer.

The N reference stations may be distributed in different regions. A location of the reference station is usually fixed. The reference station stores an accurate location of the reference station. When establishing a connection to the server 200, the reference station may send the accurate location of the reference station to the server. Each reference station may collect a satellite positioning signal in real time (for example, every second), and obtain and send measurement data to the server 200.

The server 200 stores accurate locations of the N reference stations. The server 200 may obtain differential data of different regions based on accurate location information of the reference station and the measurement data. The server 200 and the electronic device 100 may establish a wireless link, perform authentication, exchange data, and the like based on the NTRIP protocol. When receiving a reference location sent by the electronic device 100, the server 200 may send, to a measurement-type device, differential data of a target reference station that is in the N reference stations and that is closest to the electronic device 100 as positioning assistance data. The positioning assistance data may include one or more of RTK data, ephemeris data, RTD data, or a correction quantity (correction data), and other data transmitted in a differential signal format (RTCM).

After receiving the positioning assistance data sent by the server 200, the electronic device 100 may correct, based on the positioning assistance data, the measured satellite positioning result, to obtain a high-precision positioning result.

In a possible implementation, when the electronic device 100 uses a precise point positioning PPP technology; the positioning assistance data may alternatively be broadcast by the electronic device 100 from a base station in a mobile communications network or a satellite. The positioning assistance data may include a precise ephemeris, or ephemeris correction data, an atmospheric correction quantity, and the like.

In a possible implementation, when using a precise point positioning PPP technology, the electronic device 100 may obtain the positioning assistance data from a satellite. In this case, the positioning assistance data may include a precise ephemeris, or ephemeris correction data, an atmospheric correction quantity; and the like.

Figure 2:
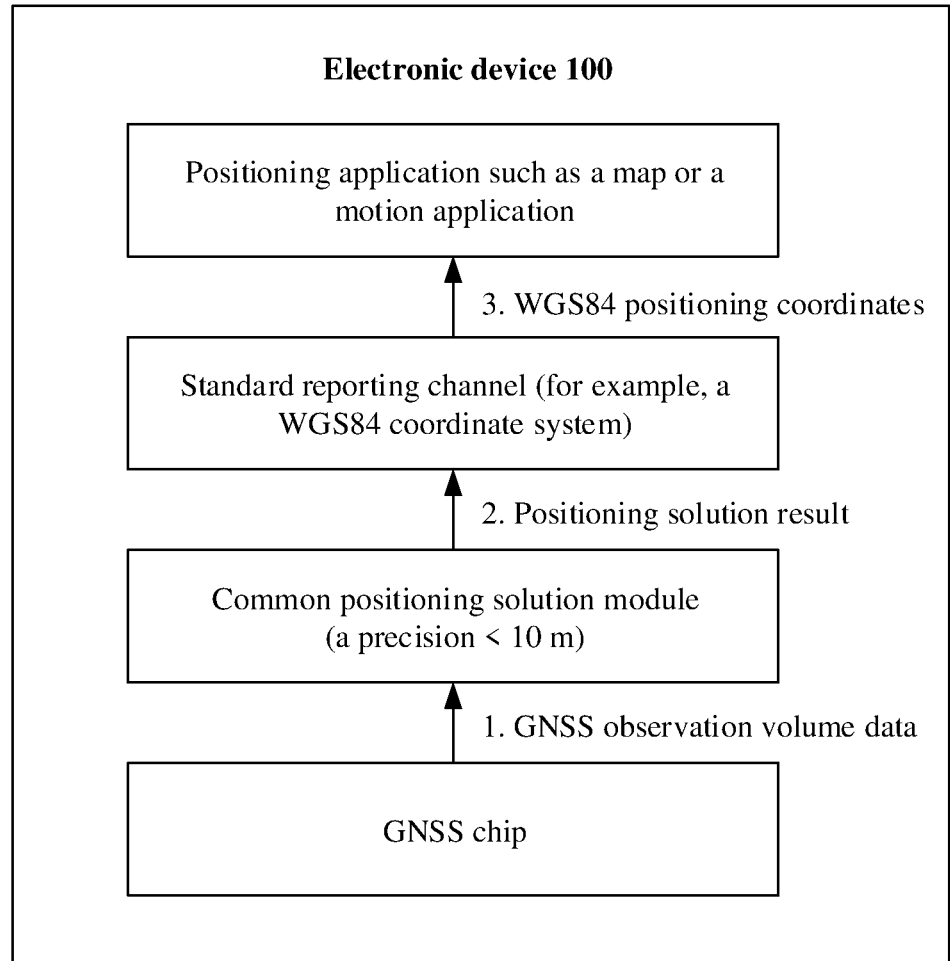
FIG. 2 is a schematic flowchart of reporting a positioning result according to an embodiment of this application.

FIG. 2 is a schematic flowchart of reporting a positioning result according to this application.

As shown in FIG. 2, a process in which an electronic device 100 reports the positioning result to an application may include the following steps:

1. The electronic device 100 may obtain GNSS observation volume data by using a GNSS chip, for example, pseudorange observation volume data and Doppler frequency observation volume data.

2. The electronic device 100 may solve a common-precision positioning result from the GNSS observation volume data by using a common positioning solution module.

3. The electronic device 100 may convert the positioning solution result into a preset coordinate system (for example, a world geodetic system (world geodetic system 1984, WGS84) coordinate system) through a standard reporting channel, to obtain WGS84 positioning coordinates, and report the WGS84 positioning coordinates to a positioning application such as a map or a motion application.

In the foregoing positioning result reporting process, the electronic device 100 converts the positioning solution result into the WGS84 positioning coordinates, and reports the WGS84 positioning coordinates to the upper-layer positioning application such as the map or the motion application. This process applies only to reporting a positioning result with a common precision (for example, a typical precision value of 3 m to 5 m). To ensure homeland security, a common unauthorized device (for example, a consumer electronic device such as a mobile phone) cannot directly output a high-precision positioning result in many countries or regions, so that the positioning result cannot be obtained and used by an unauthorized application. Therefore, the foregoing process cannot apply to reporting a positioning result with a high precision (for example, a typical precision value of less than 1 m).

Figure 3:
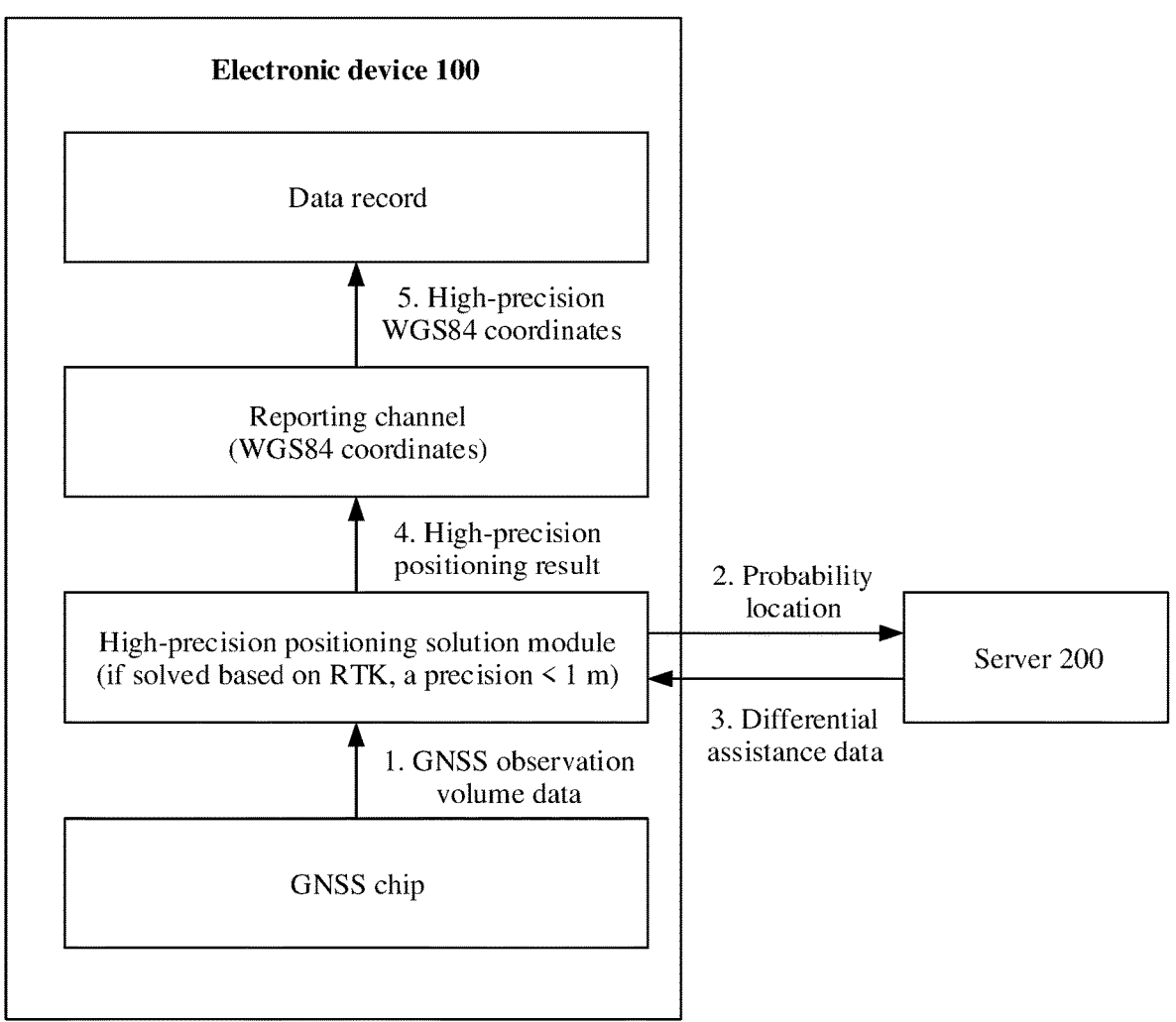
FIG. 3 is another schematic flowchart of reporting a positioning result according to an embodiment of this application.

FIG. 3 is another schematic flowchart of reporting a positioning result according to this application.

As shown in FIG. 3, a process of reporting a positioning result to an application in some electronic devices 100 used for professional measurement may include the following steps:

1. The electronic device 100 obtains GNSS observation volume data by using a GNSS chip, for example, pseudorange observation volume data, Doppler frequency observation volume data, and carrier phase observation volume data.
2. The electronic device 100 may calculate a probability location through pseudorange single-point calculation or in another manner based on the GNSS observation volume data. The electronic device 100 may report the probability location to a server 200.
3. After receiving the probability location reported by the electronic device 100, the server 200 may determine differential assistance data from measurement data of N reference stations based on the probability location (for example, may calculate a modified value based on measurement data of a reference station closest to the electronic device 100, and use the modified value as the differential assistance data). The server 200 may send the differential assistance data to the electronic device 100.
4. The electronic device 100 may complete RTK high-precision positioning based on the GNSS observation volume data and the differential assistance data by using a common positioning solution module, to obtain a high-precision positioning result.
5. The electronic device 100 may convert the high-precision positioning solution result into a preset coordinate system (for example, a WGS84 coordinate system) through a reporting channel, to obtain high-precision WGS84 positioning coordinates, and store the high-precision WGS84 positioning coordinates as a data record.

In the foregoing high-precision positioning result reporting process, the measurement device converts the high-precision positioning result into the WGS84 positioning coordinates, and stores the WGS84 positioning coordinates as the data record, and does not take any protection measure for the high-precision positioning result. To ensure homeland security, a common unauthorized device (for example, a consumer electronic device such as a mobile phone) cannot directly output a high-precision positioning result in many countries or regions, so that the positioning result cannot be obtained and used by an unauthorized application. Therefore, the foregoing high-precision positioning result reporting process cannot apply to a common consumer electronic product.

Therefore, an embodiment of this application provides a positioning method. The electronic device 100 may provide two services, namely a common positioning service and a high-precision positioning service, to an upper-layer application through permission control and an independent reporting channel design. For a common application, the electronic device 100 may report a positioning result with a common precision (for example, a typical precision value of 3 m to 5 m) to the common application through a common reporting channel. For a high-precision application, after authentication succeeds in the high-precision application, the electronic device 100 may report a positioning result with a high precision (for example, a typical precision value of less than 1 m) to the high-precision application through a high-precision reporting channel. This ensures that the channel for obtaining the positioning result by the common application is isolated from the channel for obtaining the positioning result by the high-precision application. This improves output security of the high-precision positioning result, satisfying security requirements of different countries or regions.

The following describes a schematic diagram of a structure of an electronic device 100 according to an embodiment of this application.

Figure 4:
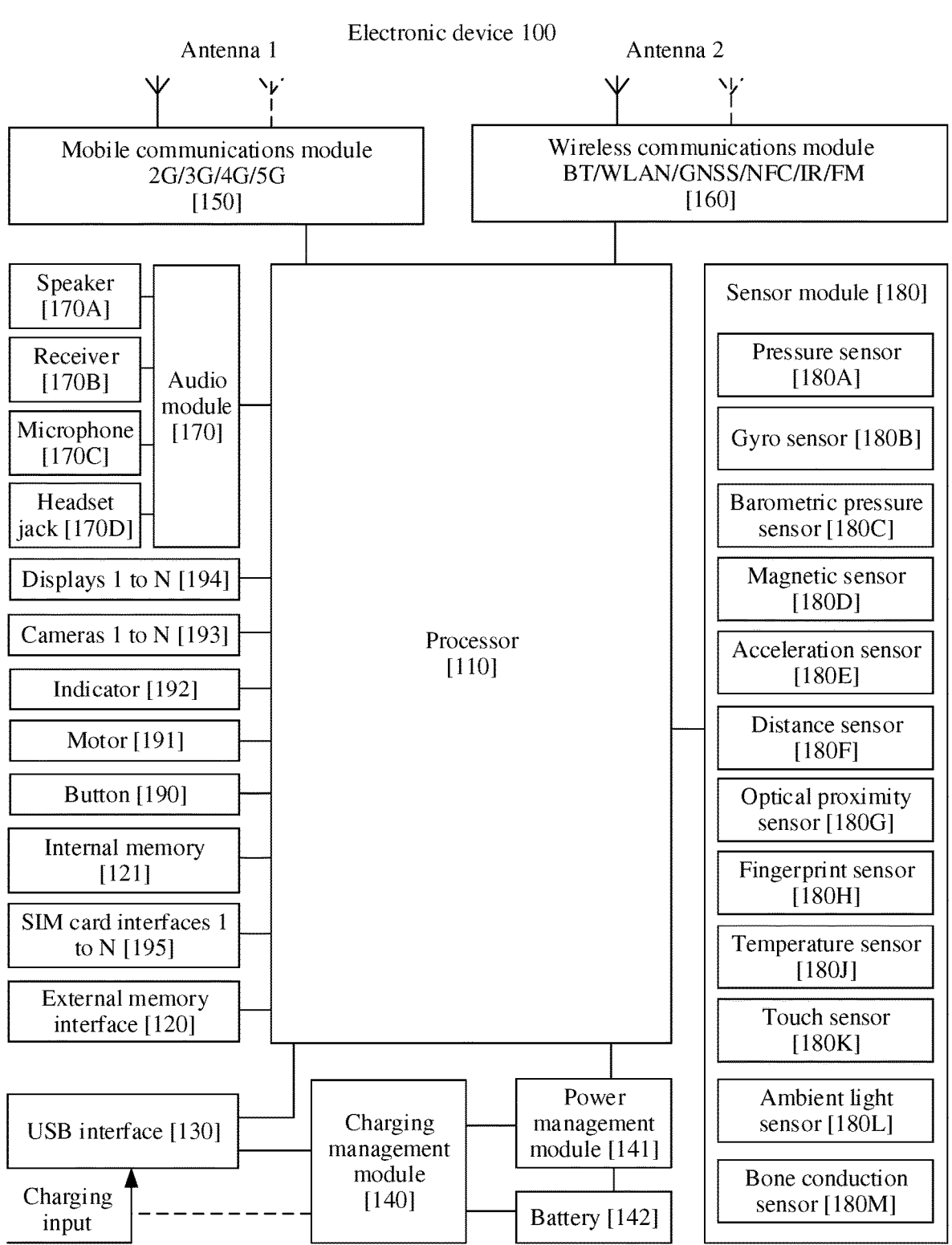
FIG. 4 is a schematic diagram of a structure of an electronic device according to an embodiment of this application.

FIG. 4 is a schematic diagram of a structure of an electronic device 100.

The following uses the electronic device 100 as an example to describe embodiments in detail. It should be understood that the electronic device 100 shown in FIG. 4 is only an example, and the electronic device 100 may have more or fewer components than those shown in FIG. 4, or may combine two or more components, or may have different component configurations. The various components shown in FIG. 4 may be implemented in hardware including one or more signal processing circuits and/or application-specific integrated circuits, software, or a combination thereof.

The electronic device 100 may be a mobile phone, a tablet computer, a desktop computer, a laptop computer, a hand-held computer, a notebook computer, an ultra-mobile personal computer (ultra-mobile personal computer, UMPC), a netbook, a cellular phone, a personal digital assistant (personal digital assistant, PDA), an augmented reality (augmented reality, AR) device, a virtual reality (virtual reality, VR) device, an artificial intelligence (artificial intelligence, AI) device, a wearable device, a vehicle-mounted device, a smart household device, and/or a smart city device. A specific type of the electronic device is not limited in this embodiment of this application.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented in hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on an instruction operation code and a time sequence signal, to complete control of instruction reading and instruction execution.

A memory may be further disposed in the processor 110, and is configured to store an instruction and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The charging management module 140 is configured to receive charging input from a charger. The charger may be a wireless charger or a wired charger.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance).

A wireless communications function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communications frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a solution applied to the electronic device 100 for wireless communications such as 2G/3G/4G/5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave for radiation through the antenna 1. In some embodiments, at least some function modules in the mobile communications module 150 may be disposed in the processor 110. In some embodiments, at least some function modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communications module 150 or another function module.

The wireless communications module 160 may provide a wireless communications solution that is applied to the electronic device 100, and that includes a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communications module 150 in the electronic device 100 are coupled, and the antenna 2 and the wireless communications module 160 in the electronic device 100 are coupled, so that the electronic device 100 can communicate with a network and another device by using a wireless communications technology. The wireless communications technology may include a global system for mobile communications (global system for mobile communications. GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN. NFC. FM, an IR technology, and/or the like. The GNSS may include a global positioning system (global positioning system. GPS), a global navigation satellite system (global navigation satellite system. GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The electronic device 100 may implement a display function through the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (or-ganic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 194. N is a positive integer greater than 1.

The electronic device 100 may implement a photographing function through the camera 193, the ISP, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 is configured to capture a still image or a video. An optical image of an object is generated through the lens, and is projected onto the photosensitive element. The photosensitive element may be a charge coupled device (charge coupled device, CCD), or a complementary metal-oxide-semiconductor (complementary metal-oxide-semi-conductor, CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the electronic device 100 may include one or N cameras 193. N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation or the like on frequency energy.

The video codec is configured to compress or decompress a digital video. The electronic device 100 may support one or more types of video codecs. In this way, the electronic device 100 may play or record videos in a plurality of coding formats, for example, moving picture experts group (moving picture experts group. MPEG)-1, MPEG-2. MPEG-3, and MPEG-4.

The NPU is a neural-network (neural-network, NN) computing processor. The NPU quickly processes input information with reference to a structure of a biological neural network, for example, a transmission mode between human brain neurons, and may further continuously perform self-learning. The NPU may implement applications such as intelligent cognition of the electronic device 100, for example, image recognition, facial recognition, speech recognition, and text understanding.

The external memory interface 120 may be used to connect to an external storage card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to perform various function applications and data processing of the electronic device 100. The internal memory 121 may include a program storage area and a data storage area. The program storage area may store an operating system, an application required by at least one function (for example, a sound playing function or an image playing function), and the like. The data storage area may store data (such as audio data and an address book) and the like that are created during use of the electronic device 100. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function such as music play and recording through the audio module 170, the speaker 170A, the receiver 170B, the microphone 170C, the headset jack 170D, the application processor, and the like.

The audio module 170 is configured to convert digital audio information into analog audio signal output, and is further configured to convert analog audio input into a digital audio signal. The audio module 170 may be further configured to code and decode an audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset.

The pressure sensor 180A is configured to sense a pressure signal, and can convert the pressure signal into an electrical signal. In some embodiments, the pressure sensor 180A may be disposed on the display 194.

The gyro sensor 180B may be configured to determine a motion posture of the electronic device 100. In some embodiments, angular velocities of electronic device 100 around three axes (which are x, y; and z axes) may be determined by using the gyro sensor 180B. The gyro sensor 180B may be configured to implement image stabilization during photographing. For example, when the shutter is pressed, the gyro sensor 180B detects an angle at which the electronic device 100 jitters, calculates, based on the angle, a distance for which a lens module needs to compensate, and allows the lens to cancel the jitter of the electronic device 100 through reverse motion, to implement image stabilization. The gyro sensor 180B may further be used in a navigation scenario and a somatic game scenario. The acceleration sensor 180E may detect accelerations in various directions (usually on three axes) of the electronic device 100. When the electronic device 100 is still, a magnitude and a direction of gravity may be detected. The acceleration sensor 180E may be further configured to identify a posture of the electronic device, and is used in an application such as switching between a landscape mode and a portrait mode or a pedometer.

In this embodiment of this application, each of the gyro sensor 180B and the acceleration sensor 180E may be referred to as an inertial measurement unit (inertial measurement unit, IMU). The inertial measurement unit may be configured to detect gyro sensor data and acceleration sensor data of the electronic device 100, to measure specific force and angular velocity information of the electronic device 100. The electronic device 100 may complete inertial navigation by combining the specific force and angular velocity information with a pseudorange observation volume and a Doppler frequency observation volume that are obtained from a GNSS chip, to deduce location coordinates of the electronic device 100 at a next moment.

In some embodiments, the electronic device 100 may alternatively complete inertial navigation by combining the specific force and the angular velocity information with the pseudorange observation volume, the Doppler frequency observation volume, a carrier phase observation volume, and positioning assistance data (for example, observation volume data and location information of a reference station in an RTK positioning technology, or a precise ephemeris, or ephemeris correction data, an atmospheric correction quantity, and the like in a precise point positioning PPP technology) that are obtained from a GNSS chip, to deduce location coordinates of the electronic device 100 at a next moment.

The barometric pressure sensor 180C is configured to measure barometric pressure. In some embodiments, the electronic device 100 calculates an altitude through the barometric pressure measured by the barometric pressure sensor 180C, to assist in positioning and navigation. The magnetic sensor 180D includes a Hall sensor. The distance sensor 180F is configured to measure a distance. The optical proximity sensor 180G may include, for example, a light emitting diode (LED) and an optical detector, for example, a photodiode. The ambient light sensor 180L is configured to sense ambient light brightness. The electronic device 100 may adaptively adjust brightness of the display 194 based on the sensed ambient light brightness. The fingerprint sensor 180H is configured to collect a fingerprint. The temperature sensor 180J is configured to detect a temperature. The touch sensor 180K is also referred to as a "touch panel". The touch sensor 180K may be disposed on the display 194, and the touch sensor 180K and the display 194 constitute a touch-screen, which is also referred to as a "touch screen". The bone conduction sensor 180M may obtain a vibration signal. The button 190 includes a power button, a volume button, and the like. The motor 191 may generate a vibration prompt. The indicator 192 may be an indicator light, and may be configured to indicate a charging status and a power change, or may be configured to indicate a message, a missed call, a notification, and the like. The SIM card interface 195 is configured to connect to a SIM card.

The following describes function modules of an electronic device 100 provided in an embodiment of this application.

Figure 5:
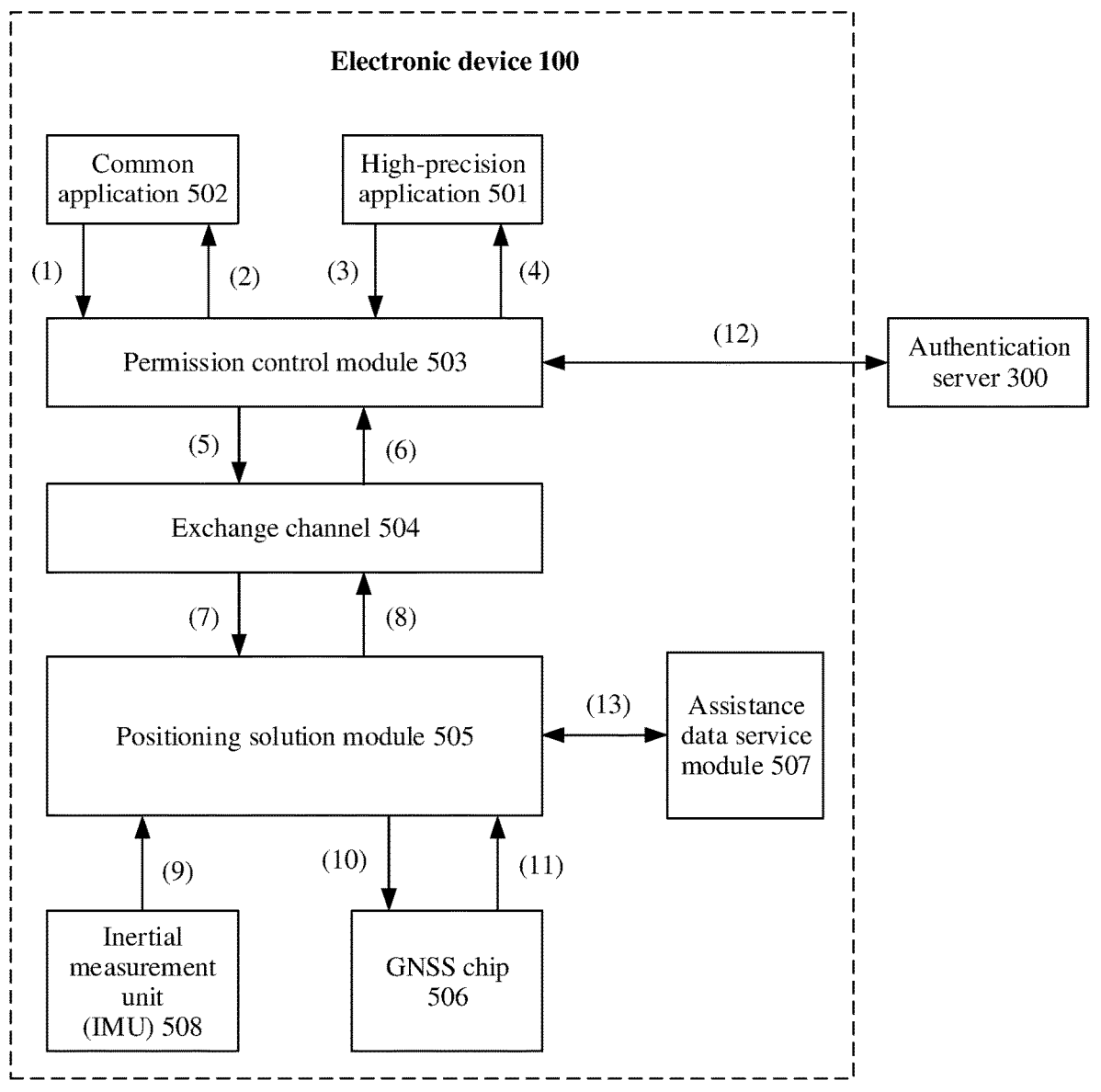
FIG. 5 is a schematic diagram of a function module of an electronic device according to an embodiment of this application.

FIG. 5 is a schematic diagram of a function module of an electronic device 100.

As shown in FIG. 5, the electronic device 100 may include a high-precision application 501, a common application 502, a permission control module 503, an exchange channel 504, a positioning solution module 505, a GNSS chip 506, an assistance data service module 507, and an inertial measurement unit 508.

The common application 502 may be an application such as a common map navigation application, a sports and health application, or a weather application. The common application 502 needs to obtain only a positioning result with a common precision (for example, a typical precision value of 3 m to 5 m). The high-precision application 501 may be a map application that provides a function such as lane-level navigation. The high-precision application 501 needs to obtain a positioning result with a high precision (for example, a typical precision value of less than 1 m).

When only the common application 502 initiates a positioning request through a channel (1), the permission control module 503 may enable only a common positioning function, and deliver a positioning instruction to the positioning solution module 505 through the exchange channel 504 and the channel (7). After receiving the positioning instruction, the positioning solution module 505 may obtain a pseudorange observation volume and a Doppler frequency observation volume that are reported by the GNSS chip 506 through a channel (11), to complete common positioning, and obtain a common-precision positioning result.

In some embodiments, the positioning solution module 505 may complete common positioning based on the pseudorange and Doppler frequency observation volumes reported by the GNSS chip 506 and the inertial measurement data (including data such as acceleration sensor data and gyro sensor data) reported by the inertial measurement unit (IMU) 508, to obtain a common positioning result. After obtaining the positioning solution result with the common precision, the positioning solution module 505 may report the common positioning result to the exchange channel 504 through a channel (8). After performing some processing, the exchange channel 504 may sequentially report the common positioning result to the common application 502 through a channel (6) and a channel (2).

When receiving a high-precision positioning request initiated by the high-precision application 501 through a channel (3), the permission control module 503 may perform an authentication operation (12) on the high-precision application 501 with an authentication server 300. After the authentication succeeds, the permission control module 503 may enable a high-precision positioning function, and sequentially deliver a high-precision positioning instruction to the positioning solution module 505 through a channel (5) and a channel (7). The positioning solution module 505 may obtain the pseudorange observation volume, the Doppler frequency observation volume, and the carrier phase observation that are reported by the GNSS chip 506 through the channel (11). The positioning solution module 505 may further obtain positioning assistance data (or observation volume correction data) from the assistance data service module 507 through a channel (13). The positioning solution module 505 may complete high-precision positioning solution based on the pseudorange observation volume, the Doppler frequency observation volume, the carrier phase observation, and the positioning assistance data, to obtain a high-precision positioning result.

A high-precision positioning algorithm may use a plurality of forms. 1. Real-time kinematic (real-time kinematic. RTK) positioning technology: The assistance data service module 507 may obtain the positioning assistance data from the server 200 or a base station. The positioning assistance data may include observation volume data and location information of a reference station. 2. Precise point positioning (precise point positioning. PPP) technology: The assistance data service module 507 may obtain positioning assistance data sent by a mobile communications base station or broadcast by a satellite. The positioning assistance data may include a precise ephemeris, or ephemeris correction data, an atmospheric correction quantity, and the like. In a specific implementation, the positioning solution module 505 may further combine the RTK and PPP technologies.

In some embodiments, the inertial measurement unit (IMU) 508 may measure inertial measurement data of the electronic device 100. The inertial measurement data may include gyro sensor data and acceleration sensor data. The positioning solution module 505 may obtain the inertial measurement data from the inertial measurement unit (IMU) 508 through a channel (9). The positioning solution module 505 may complete inertial navigation based on the high-precision positioning algorithm and the inertial measurement data, to further improve a positioning precision and positioning stability, and obtain a high-precision positioning result. For example, RTK positioning may be combined with vehicle-mounted dead-reckoning (vehicle dead reckoning, VDR).

After solving the high-precision positioning result, the positioning solution module 505 may sequentially report the high-precision positioning result to the high-precision application 501 through an independent reporting channel (for example, a channel (8), a channel (6), and a channel (4)). After obtaining the high-precision positioning result, the high-precision application 501 may complete a high-precision positioning service with reference to a map resource package, for example, implement lane-level navigation. In a process of reporting the high-precision positioning result, the exchange channel 504 may sequentially perform standard coordinate format conversion on the high-precision positioning result and encrypt the high-precision positioning result according to a preset encryption algorithm, to obtain encrypted deflection coordinates. The exchange channel 504 may finally report the encrypted deflection coordinates to the high-precision application 501.

When the common application 502 and the high-precision application 501 simultaneously initiate positioning requests, the common positioning result and the high-precision positioning result need to be simultaneously output. In terms of a positioning precision and a coordinate format, the common positioning result and the high-precision positioning result are different. The common application 502 and the high-precision application initiate the positioning requests through independent channels. For example, the common application 502 initiates the positioning request through the channel (1), and the high-precision application 501 initiates the positioning request through the channel (3). The positioning solution module 505 reports the positioning results to the common application 502 and the high-precision application 501 through independent channels. For example, the positioning solution module 505 reports the common positioning result to the common application 502 through the channel (2), and the positioning solution module 505 may report the high-precision positioning result to the high-precision application 501 through the channel (4).

In some embodiments, after solving the positioning result (the common positioning result or the high-precision positioning result), the positioning solution module 505 may calculate assistance information (for example, code phase information, a Doppler frequency information, or even carrier phase information) of the positioning result for different satellites. The positioning solution module 505 may send the assistance information to the GNSS chip 506 through a channel (10). After receiving the assistance information, the GNSS chip 506 may capture and track a satellite signal by using the assistance information. This improves accuracy of obtaining the GNSS observation volume data by the GNSS chip 506. In this way: positioning performance can be further improved.

In some embodiments of this application, the electronic device 100 may report the high-precision positioning result to the high-precision application by invoking a specified interface. For example, the electronic device 100 may invoke a requestHDLocationUpdate interface or a request-LocationUpdatesEx interface in huawei mobile service (huawei mobile service. HMS), to send the high-precision positioning result to the high-precision application. The foregoing example is only used to explain this application and should not be construed as a limitation.

The following specifically describes a process of reporting a positioning result in this embodiment of this application with reference to a function module in the electronic device 100.

Figure 6:
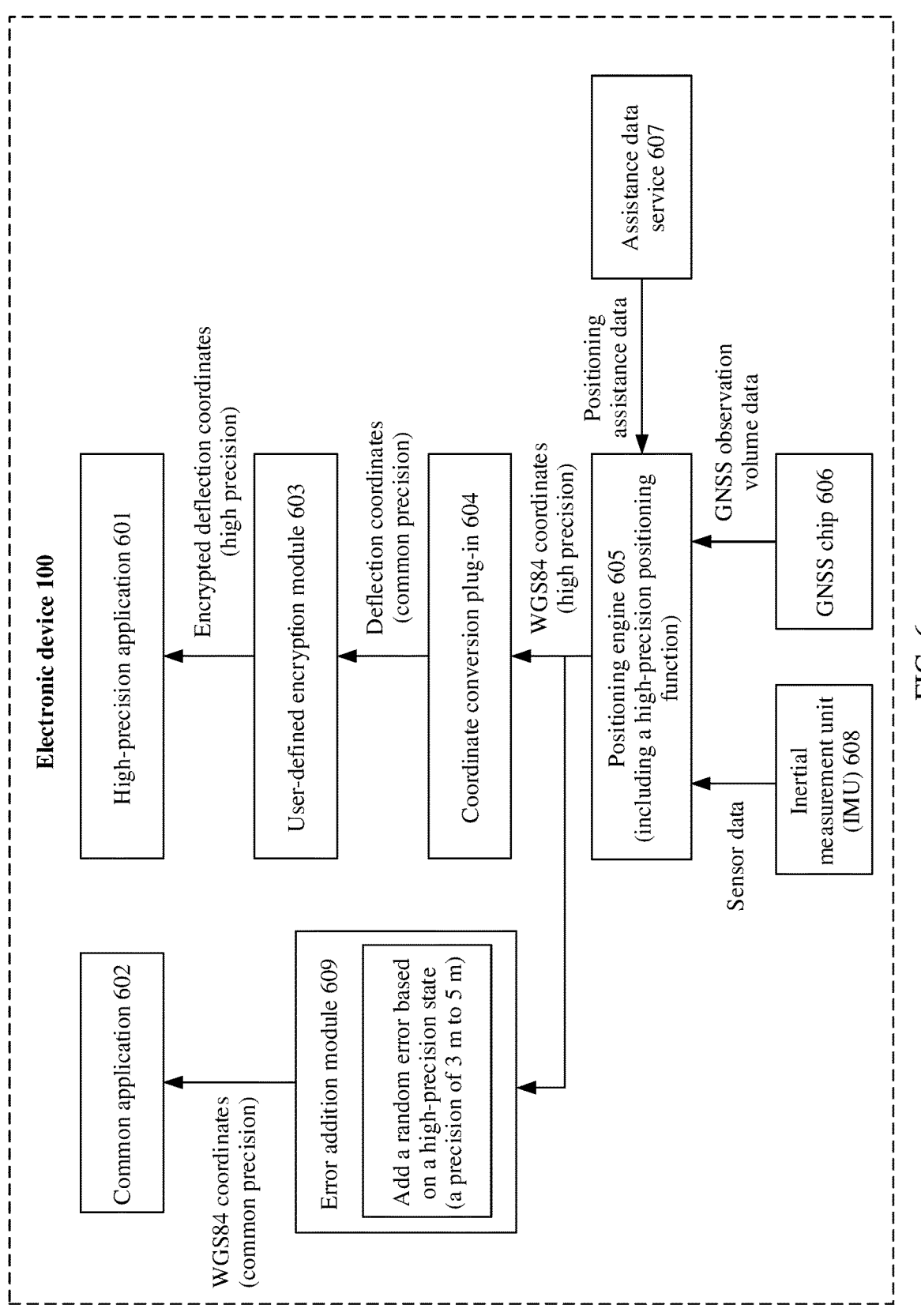
FIG. 6 is a schematic diagram of another function module of an electronic device according to an embodiment of this application.

FIG. 6 is a schematic diagram of a function module of an electronic device 100 according to an embodiment of this application.

As shown in FIG. 6, the electronic device 100 may include a high-precision application 601, a common application 602, a user-defined encryption module 603, a coordinate conversion plug-in 604, a positioning engine 605, a GNSS chip 606, an assistance data service 607, and an error addition module 609. Optionally, the electronic device 100 may further include an inertial measurement unit 608.

The high-precision application 601 may be a map application that provides a function such as lane-level navigation. The high-precision application 601 needs to obtain a positioning result with a high precision (for example, a typical precision value of less than 1 m). The common application 602 may be an application such as a common map navigation application, a sports and health application, or a weather application. The common application 602 needs to obtain only a positioning result with a common precision (for example, a typical precision value of 3 m to 5 m).

The positioning solution module may include a positioning engine 605. The positioning engine 605 may include a common positioning function and a high-precision positioning function. The common positioning result and the high-precision positioning result that are reported by the positioning engine 605 are separately reported to an upper-layer application through two independent channels. This can ensure that a reporting channel for the common positioning result is isolated from a reporting channel for the high-precision positioning result, in other words, channel-level isolation.

After the high-precision application 601 initiates a high-precision positioning request and authentication succeeds, the positioning engine 605 may obtain GNSS observation volume data from the GNSS chip 606, and obtain positioning assistance data by using the assistance data service 607. The GNSS observation volume data may include a pseudorange observation volume, a Doppler frequency observation volume, a carrier phase observation volume, and the like. When the positioning assistance data includes observation volume data and location information of a reference station, the positioning engine 605 may complete RTK solution based on the GNSS observation volume data and the positioning assistance data, to obtain high-precision WGS84 coordinates. When the positioning assistance data includes a precise ephemeris, or ephemeris correction data, an atmospheric correction quantity; and the like, the positioning engine 605 may complete PPP high-precision solution based on the GNSS observation volume data and the positioning assistance data, to obtain high-precision WGS84 coordinates. When the positioning assistance data includes observation volume data and location information of a reference station, a precise ephemeris, or ephemeris correction data, an atmospheric correction quantity, and the like, the positioning engine 605 may complete solution by combining RTK and PPP based on the GNSS observation volume data and the positioning assistance data, to obtain high-precision WGS84 coordinates.

The high-precision positioning result solved by the positioning engine 605 is not limited to a coordinate format of the WGS84 coordinate system, and may further be a format of another coordinate system (for example, a Beijing 1954 coordinate system and a Xi'an 1980) coordinate system).

In this embodiment of this application, not only the foregoing RTK and PPP technologies may be used for high-precision positioning performed by the positioning engine 605. Another differential positioning technology such as real time differential (real time differential, RTD) and post processed kinematic (post processed kinematic, PPK). This is not limited in this embodiment of this application. When the high-precision positioning engine 605 uses different differential positioning technologies, content in the positioning assistance data is also different.

In a possible implementation, the positioning engine 605 may further obtain inertial measurement data from the inertial measurement unit 609. The inertial measurement data includes acceleration sensor data, gyro sensor data, and the like. The positioning engine 605 may further improve a positioning precision and positioning stability based on the GNSS observation volume data and the inertial measurement data that is reported by the inertial measurement unit 608, to obtain a high-precision positioning result. For example, the RTK positioning technology may be combined with a VDR technology.

The positioning engine 605 may report the high-precision WGS84 coordinates to the coordinate conversion plug-in 604. The coordinate conversion plug-in 604 (for example, in China, a GCJ02 deflection plug-in provided by the Chinese State Bureau of Surveying and Mapping) may add a deflection factor to the high-precision WGS84 coordinates, to obtain high-precision deflection coordinates.

The coordinate conversion plug-in 604 may report the high-precision deflection coordinates to the user-defined encryption module 603. The user-defined encryption module 603 may encrypt the high-precision deflection coordinates according to a preset encryption algorithm (for example, an SM4 Chinese encryption algorithm), to obtain the encrypted deflection coordinates.

The user-defined encryption module 603 may report the encrypted deflection coordinates to the high-precision application 601. A decryption key corresponding to the preset encryption algorithm is preset in the high-precision application 601. In the high-precision application 601, a deflection plug-in that is the same as the coordinate conversion plug-in 604 may be used to add a deflection factor to coordinates in a map resource package, to obtain a deflection map resource package. In the high-precision application 601, the high-precision deflection coordinates may be decrypted from the encrypted deflection coordinates based on the decryption key corresponding to the preset encryption algorithm. The high-precision application 601 may perform a high-precision navigation service such as the lane-level navigation based on the high-precision deflection coordinates and the deflection map resource package.

When the common application 602 initiates a common positioning request, the positioning engine 605 may enable a common positioning function, and obtain data such as a pseudorange observation volume and a Doppler frequency observation volume from the GNSS chip 606. The positioning engine 605 may stop obtaining the positioning assistance data from the assistance data service 607, and complete positioning solution based on the data such as the pseudorange observation volume and the Doppler frequency observation volume, to obtain common-precision WGS84 coordinates.

In a possible implementation, the positioning engine 605 may complete inertial navigation based on the data such as the pseudorange observation volume and the Doppler frequency observation volume, and the inertial measurement data (including data such as the acceleration sensor data and the gyro sensor data) reported by the inertial measurement unit 608, to obtain the common positioning result.

The positioning engine 605 obtains the common-precision WGS84 coordinates, and reports the common-precision WGS84 coordinates to the common application 602.

In some embodiments, the common application 602 and the high-precision application 60 may each simultaneously initiate a positioning request. The positioning engine 605 cannot separate two types of results. Therefore, after obtaining the positioning request initiated by the common application 602, the positioning engine 605 may solve the WGS84 coordinates based on the GNSS measurement data and the positioning assistance data. The positioning engine 605 may report the solved WGS84 coordinates to the error addition module 609. The error addition module 609 may add a random error to the solved WGS84 coordinates based on a high-precision state, to obtain the common-precision WGS84 coordinates.

The error addition module 609 may determine whether a precision value of the WGS84 coordinates solved by the GNSS chip 606 is less than a preset precision value (for example, 3 m). If the precision value of the WGS84 coordinates solved by the GNSS chip 606 is less than the preset precision value, the error addition module 609 may add the random error to the high-precision WGS84 coordinates, to increase the precision value of the high-precision WGS84 coordinates (for example, to increase the precision value to 3 m from 5 m), to obtain the common-precision WGS84 coordinates. If a precision value of the WGS84 coordinates solved by the GNSS chip 606 is greater than or equal to a preset precision value (for example, 3 m), the error addition module 609 may directly report the solved WGS84 coordinates to the common application 602.

The positioning engine 605 may calculate a positioning precision when solving the WGS84 coordinates based on the GNSS measurement data and the positioning assistance data. For example, the positioning engine 605 may solve the WGS84 coordinates by using a Kalman (Kalman) filter based on the GNSS measurement data and the positioning assistance data. A covariance matrix of the Kalman (Kalman) filter may provide an estimated positioning precision value.

In the process of reporting the positioning result provided in this embodiment of this application, a sub-meter-level (<1 m) high-precision positioning service can be implemented in the electronic device 100 by using a GNSS high-precision positioning technology alone or in combination with an inertial navigation technology. This can implement a high-precision application such as the lane-level navigation. In addition, two services, namely a common positioning service and a high-precision positioning service, are simultaneously provided through permission control and an independent channel design. The electronic device 100 may separately report the common positioning result and the high-precision positioning result through independent channels, and perform coordinate conversion and encryption processing in a process of reporting the high-precision positioning result. This fully ensures output security of the high-precision positioning result, satisfying requirements of policies, laws and regulations of different countries or regions.

The following specifically describes another process of reporting a positioning result in an embodiment of this application with reference to a function module in an electronic device 100.

Figure 7:
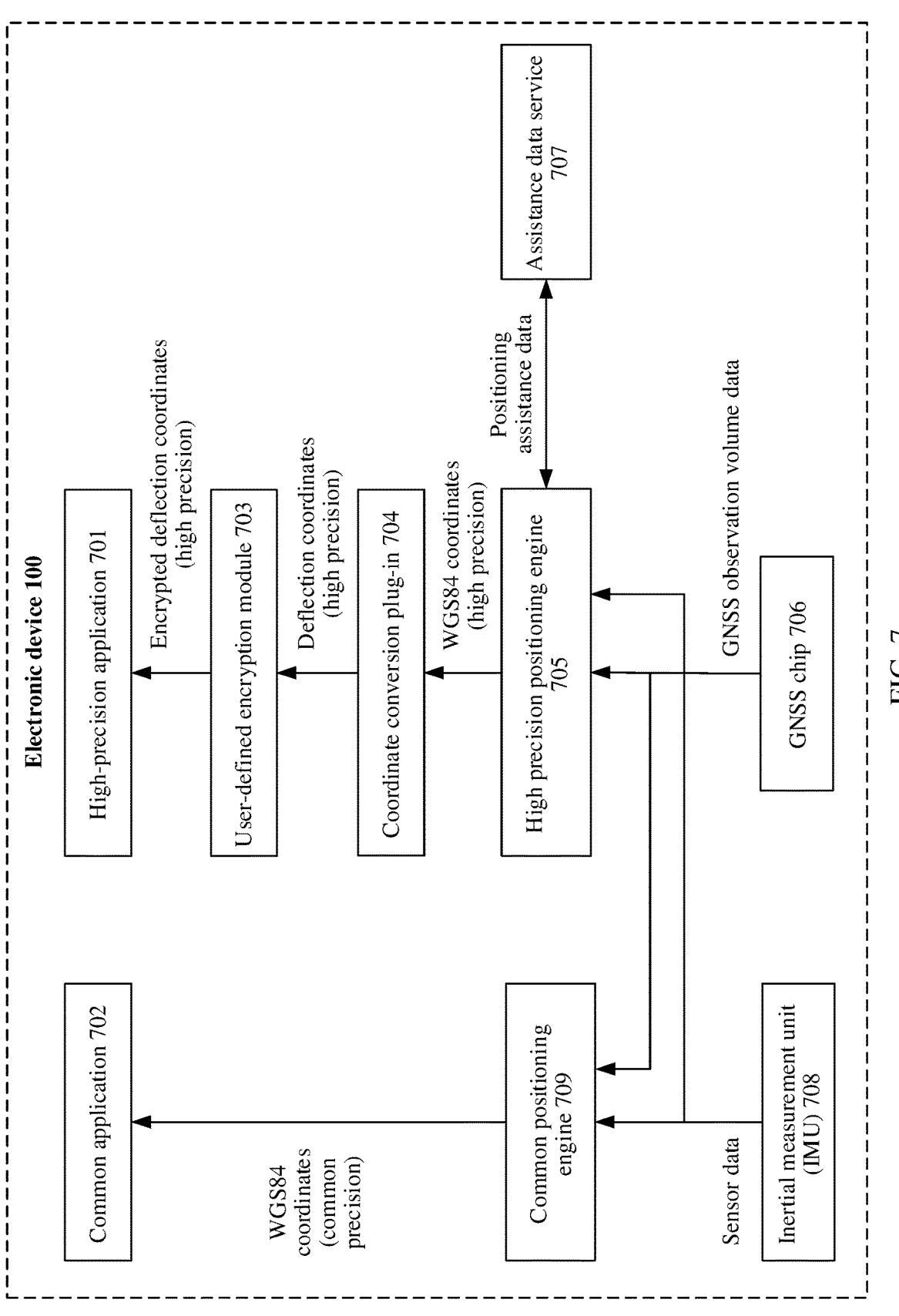
FIG. 7 is a schematic diagram of another function module of an electronic device according to an embodiment of this application.

FIG. 7 is a schematic diagram of a function module of an electronic device 100 according to an embodiment of this application.

As shown in FIG. 7, the electronic device 100 may include a high-precision application 701, a common application 702, a user-defined encryption module 703, a coordinate conversion plug-in 704, a high-precision positioning engine 705, a GNSS chip 706, an assistance data service 707, and a common positioning engine 709. Optionally, the electronic device 100 may further include an inertial measurement unit (IMU) 708.

The high-precision application 701 may be a map application that provides a function such as lane-level navigation. The high-precision application 701 needs to obtain a positioning result with a high precision (for example, a typical precision value of less than 1 m). The common application 702 may be an application such as a common map navigation application, a sports and health application, or a weather application. The common application 702 needs to obtain only a positioning result with a common precision (for example, a typical precision value of 3 m to 5 m).

The positioning solution module may include a high-precision positioning engine 705 and a common positioning engine 709.

The common positioning engine 709 may be configured to: obtain a pseudorange observation volume, a Doppler frequency observation volume, and the like from the GNSS chip 706, and complete positioning solution based on the pseudorange observation volume, the Doppler frequency observation volume, and the like, to obtain common-precision WGS84 coordinates. Optionally, the common positioning engine 709 may further obtain inertial measurement data from the inertial measurement unit 708. The inertial measurement data includes acceleration sensor data and gyro sensor data. The common positioning engine 709 may complete inertial navigation based on the inertial measurement data, the pseudorange observation volume, the Doppler frequency observation volume, and the like, and calculate the common-precision WGS84 coordinates. The common positioning engine 709 may report the common-precision WGS84 coordinates to the common application 702.

The high-precision positioning engine 705 may be configured to obtain GNSS observation volume data from the GNSS chip 706. The GNSS observation volume data includes the pseudorange observation volume, the Doppler frequency observation volume, a carrier phase observation volume, and the like. The high-precision positioning engine 705 may obtain positioning assistance data from the assistance data service 707.

In a possible implementation, the positioning assistance data may include observation volume data (including a pseudorange, a Doppler frequency, a carrier phase, and the like of a satellite measured by a reference station) and location information of the reference station. The high-precision positioning engine 705 may complete RTK solution based on the GNSS observation volume data and the positioning assistance data, to obtain high-precision WGS84 coordinates.

In a possible implementation, the positioning assistance data may include a precise ephemeris, or ephemeris correction data, an atmospheric correction quantity; and the like. The high-precision positioning engine 705 may complete PPP high-precision solution based on the GNSS observation volume data and the positioning assistance data, to obtain high-precision WGS84 coordinates.

In a possible implementation, the positioning assistance data includes observation volume data and location information of a reference station, a precise ephemeris, or ephemeris correction data, an atmospheric correction quantity; and the like. The high-precision positioning engine 705 may complete solution by combining RTK and PPP based on the GNSS observation volume data and the positioning assistance data, to obtain high-precision WGS84 coordinates.

In a possible implementation, the high-precision positioning engine 705 may further obtain inertial measurement data from the inertial measurement unit 709. The inertial measurement data includes acceleration sensor data, gyro sensor data, and the like. The high-precision positioning engine 705 may further improve a positioning precision and positioning stability based on the GNSS observation volume data and the inertial measurement data reported by the inertial measurement unit 708, to obtain a high-precision positioning result. For example, the RTK positioning technology may be combined with a VDR technology.

The high-precision positioning result solved by the high-precision positioning engine 705 is not limited to a coordinate format of the WGS84 coordinate system, and may further be a format of another coordinate system (for example, a Beijing 1954 coordinate system and a Xi'an 1980 coordinate system).

In this embodiment of this application, not only the foregoing RTK and PPP technologies may be used for high-precision positioning performed by the high-precision positioning engine 705. Another differential positioning technology such as RTD and PPK. This is not limited in this embodiment of this application. When the high-precision positioning engine 705 uses different differential positioning technologies, the positioning assistance data is also different.

After solving the high-precision WGS84 coordinates, the high-precision positioning engine 705 may report the WGS84 coordinates to the coordinate conversion plug-in 704. The coordinate conversion plug-in 704 (for example, in China, a GCJ02 deflection plug-in provided by the Chinese State Bureau of Surveying and Mapping) may add a deflection factor to the high-precision WGS84 coordinates, to obtain high-precision deflection coordinates.

The coordinate conversion plug-in 704 may report the high-precision deflection coordinates to the user-defined encryption module 703. The user-defined encryption module 703 may encrypt the high-precision deflection coordinates according to a preset encryption algorithm (for example, an SM4 Chinese encryption algorithm), to obtain the encrypted deflection coordinates.

The user-defined encryption module 703 may report the encrypted deflection coordinates to the high-precision application 701. A decryption key corresponding to the preset encryption algorithm is preset in the high-precision application 701. A map resource package in the high-precision application 701 is also processed by the coordinate conversion plug-in. To be specific, location coordinates in the map resource package are obtained by adding a deflection factor to real location coordinates by the coordinate conversion plug-in. In the high-precision application 701, the high-precision deflection coordinates may be decrypted from the encrypted deflection coordinates based on the decryption key corresponding to the preset encryption algorithm. The high-precision application 701 may perform a high-precision navigation service such as the lane-level navigation based on the high-precision deflection coordinates and the map resource package.

In the process of reporting the positioning result provided in this embodiment of this application, a sub-meter-level (<1 m) high-precision positioning service can be implemented in the electronic device 100 by using a GNSS high-precision positioning technology alone or in combination with an inertial navigation technology. This can implement a high-precision application such as the lane-level navigation. In addition, two services, namely a common positioning service and a high-precision positioning service, are simultaneously provided through permission control and an independent channel design. The electronic device 100 may separately calculate a common positioning result and a high-precision positioning result by using different positioning engines, and perform coordinate conversion and encryption processing in a process of reporting the high-precision positioning result. This fully ensures output security of the high-precision positioning result, satisfying security requirements on the positioning result of policies, laws and regulations of different countries or regions.

The following describes a schematic flowchart of a positioning method according to an embodiment of this application.

Figure 8:
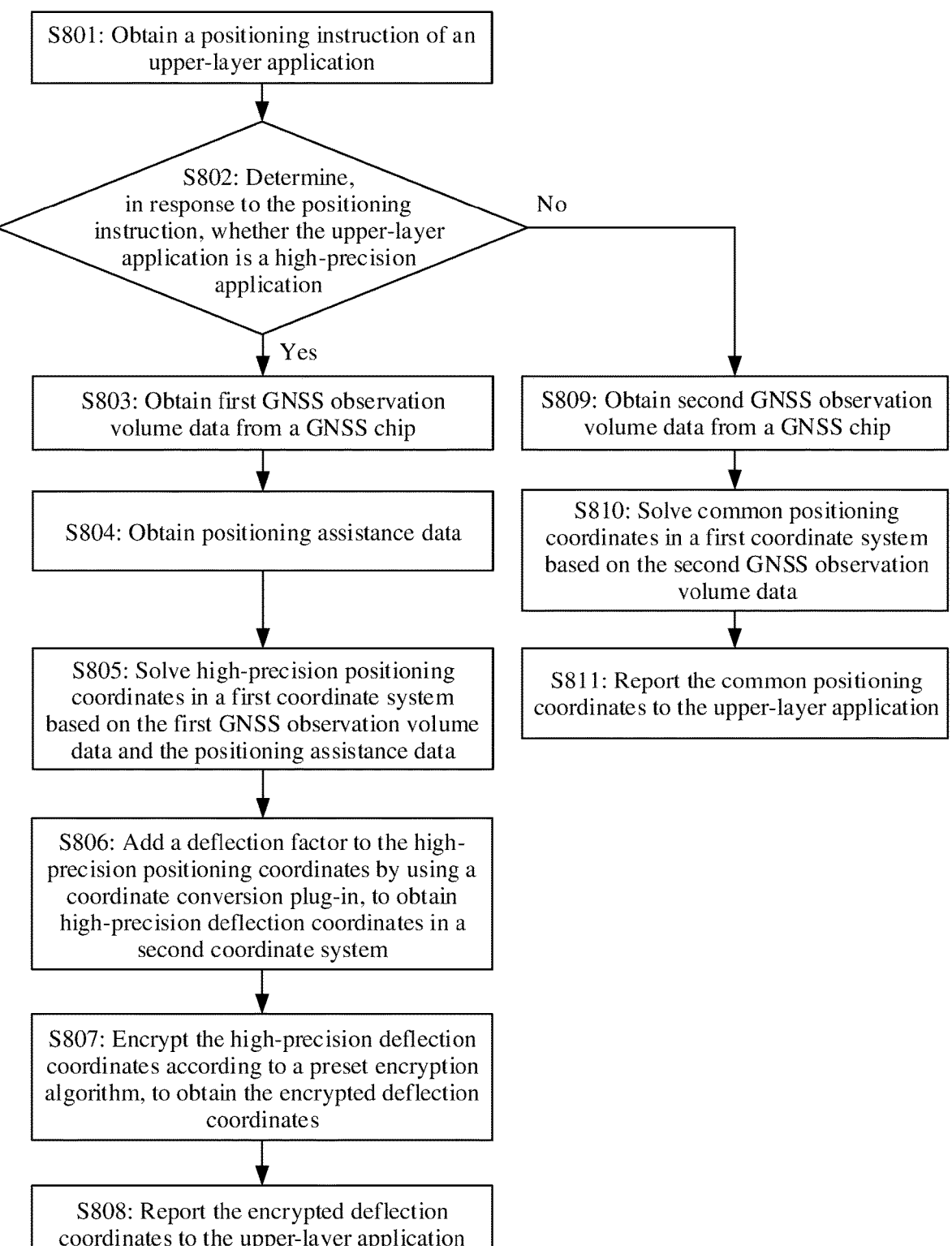
FIG. 8 is a schematic flowchart of a positioning method according to an embodiment of this application.

FIG. 8 is a schematic flowchart of a positioning method according to an embodiment of this application.

As shown in FIG. 8, the method may include the following steps.

S801: An electronic device 100 obtains a positioning instruction of an upper-layer application.

The upper-layer application may be a common application or a high-precision application. The common application may include an application such as a common map navigation application, a sports and health application, or a weather application. The high-precision application may include a map application that provides a function such as lane-level navigation, and the like. The high-precision application may obtain a positioning result with a high precision (for example, a typical precision value of less than 1 m). The common application needs to obtain only a positioning result with a common precision (for example, a typical precision value of 3 m to 5 m).

For example, the electronic device 100 may receive an input (for example, a tap operation) performed by a user on a navigation start control in a navigation application interface, and obtain a positioning instruction delivered by the navigation application in response to the input. For another example, the electronic device 100 may receive an input of opening a weather application by the user, and obtain a positioning instruction delivered by the weather application in response to the input.

S802: The electronic device 100 may determine, in response to the positioning instruction, whether the upper-layer application is a high-precision application. If the upper-layer application is the high-precision application, the electronic device 100 performs step S803 to step S808. If the upper-layer application is not the high-precision application, the electronic device 100 performs step S809 to step S811.

After obtaining the positioning instruction, the electronic device 100 may authenticate, by using an authentication server, the upper-layer application that initiates the positioning instruction. Specifically, after obtaining the positioning instruction, the electronic device 100 may send an authentication request to the authentication server. The authentication request includes an identifier of the upper-layer application. The authentication server may check whether a stored high-precision application whitelist includes the identifier of the upper-layer application. If the stored high-precision application whitelist includes the identifier of the upper-layer application, the authentication server may return authentication success information to the electronic device 100. The authentication success information may indicate that the upper-layer application is a high-precision application. The high-precision application whitelist includes identifiers of a plurality of high-precision applications. After receiving the authentication success information sent by the authentication server, the electronic device 100 may determine that the upper-layer application is a high-precision application.

When the authentication server determines that the high-precision application whitelist does not include the identifier of the upper-layer application, the authentication server may return authentication failure information to the electronic device 100. The authentication failure information may indicate that the upper-layer application is a common application. After receiving the authentication failure information sent by the authentication server, the electronic device 100 may determine that the upper-layer application is a common application.

In a possible implementation, the high-precision application whitelist may be stored in the electronic device 100. The electronic device 100 may determine whether the high-precision application whitelist includes the identifier of the upper-layer application. If the high-precision application whitelist includes the identifier of the upper-layer application, the electronic device 100 may determine that the upper-layer application is a high-precision application: or if the high-precision application whitelist does not include the identifier of the upper-layer application, the electronic device 100 may determine that the upper-layer application is a common application.

S803: The electronic device 100 may obtain first GNSS observation volume data from a GNSS chip.

When determining that the upper-layer application is a high-precision application, the electronic device 100 may obtain the first GNSS observation volume data from the GNSS chip. The first GNSS observation volume data includes a pseudorange observation volume, a Doppler frequency observation volume, a carrier phase observation volume, and the like.

S804: The electronic device 100 may obtain positioning assistance data.

S805: The electronic device 100 may solve high-precision positioning coordinates in a first coordinate system based on the first GNSS observation volume data and the positioning assistance data.

When using an RTK positioning technology, the electronic device 100 may calculate a reference location based on the first GNSS observation volume data. As an example, the electronic device 100 may solve the reference location based on the pseudorange observation volume. The electronic device 100 may send the reference location to a server 200. The server 200 may determine, from N reference stations based on the reference location, one or more reference stations that are close to the reference location, and determine observation volume data (including a pseudorange, a Doppler frequency, a carrier phase, and the like of a satellite measured by the reference station) and location information of the one or more reference stations as the positioning assistance data. The server 200 may send the positioning assistance data to the electronic device 100.

When using a PPP technology, the electronic device 100 may obtain the positioning assistance data from a navigation message of a satellite. The positioning assistance data may include a precise ephemeris, or ephemeris correction data, an atmospheric correction quantity, and the like.

When the electronic device 100 performs positioning by combining the RTK positioning technology and the precise point positioning PPP technology, the positioning assistance data may include observation volume data (including a pseudorange, a Doppler frequency, a carrier phase, and the like of a satellite measured by the reference station) and location information of one or more reference stations, a precise ephemeris, or ephemeris correction data, an atmospheric correction quantity, and the like.

In this embodiment of this application, not only the foregoing RTK and PPP technologies may be used for high-precision positioning performed by the electronic device 100. Another differential positioning technology such as real time differential (real time differential, RTD) and post processed kinematic (post processed kinematic, PPK). This is not limited in this embodiment of this application. When different differential positioning technologies are used, content in the positioning assistance data is also different.

In a possible implementation, the electronic device 100 may measure inertial measurement data of the electronic device 100 by using an inertial measurement unit (IMU). The inertial measurement data includes acceleration sensor data, gyro sensor data, and the like. The electronic device 100 may perform inertial navigation based on the first GNSS observation volume data and the inertial measurement data, to further improve a positioning precision and positioning stability, and obtain the high-precision positioning coordinates. For example, the RTK positioning technology may be combined with a VDR technology.

In this embodiment of this application, the first coordinate system may be a WGS84 coordinate system, a Beijing 1954 coordinate system, a Xi'an 1980 coordinate system, or the like, or another coordinate system. This should not be construed as a limitation.

S806: The electronic device 100 may add a deflection factor to the high-precision positioning coordinates by using a coordinate conversion plug-in, to obtain high-precision deflection coordinates in a second coordinate system.

Specifically, the electronic device 100 may calculate a deflection factor corresponding to the high-precision positioning coordinates according to a deflection algorithm in the coordinate conversion plug-in. Then, the electronic device 100 may add the deflection factor to the high-precision positioning coordinates to obtain the high-precision deflection coordinates in the second coordinate system.

The coordinate conversion plug-in may include any one of a GCJ02 coordinate conversion plug-in, a BD09 coordinate system conversion plug-in, and the like. The second coordinate system is any one of a GCJ02 coordinate system, a BD09 coordinate system, and the like. When the coordinate conversion plug-in is the GCJ02 coordinate conversion plug-in, the second coordinate system is the GCJ02 coordinate system.

For example, the high-precision positioning coordinates solved by the electronic device 100 may be "latitude: 22.533867387389293, and longitude: 113.918884573070101" in the WGS84 coordinate system. The deflection factor determined by the electronic device 100 based on the high-precision positioning coordinates according to the deflection algorithm in the coordinate conversion plug-in includes "a latitude deflection factor: 0.010010110111001, and a longitude deflection factor: 0.011000111010011". The electronic device 100 adds the latitude deflection factor of the deflection factor to the latitude value of the high-precision positioning coordinates, and adds the longitude deflection factor of the deflection factor to the longitude value of the high-precision positioning coordinates, to obtain the high-precision deflection coordinates. The high-precision deflection coordinates may be "latitude: 22.543877497500294, and longitude: 113.929884684080112". The foregoing example is only used to explain this application and should not be construed as a limitation.

S807: The electronic device 100 may encrypt the high-precision deflection coordinates according to a preset encryption algorithm, to obtain the encrypted deflection coordinates.

The electronic device 100 may encrypt the high-precision deflection coordinates according to a preset encryption algorithm (for example, an SM4 Chinese encryption algorithm), to obtain the encrypted deflection coordinates. A decryption key corresponding to the preset encryption algorithm may be preset in the high-precision application.

S808: The electronic device 100 may report the encrypted deflection coordinates to the upper-layer application.

When the upper-layer application is a high-precision application, a decryption key corresponding to the preset encryption algorithm is preset in the upper-layer application. After the electronic device 100 reports the encrypted deflection coordinates to the upper-layer application, the upper-layer application may decrypt the encrypted deflection coordinates by using the decryption key, to obtain the high-precision deflection coordinates. The upper-layer application may include a map resource package. The map resource package is also processed by the coordinate conversion plug-in. To be specific, location coordinates in the map resource package are obtained by adding a deflection factor to real location coordinates by the coordinate conversion plug-in. The upper-layer application may perform a high-precision navigation service such as the lane-level navigation based on the high-precision deflection coordinates and the map resource package.

S809: The electronic device 100 may obtain second GNSS observation volume data from a GNSS chip.

When the upper-layer application is not a high-precision application (in other words, is a common application), the electronic device 100 may obtain the second GNSS observation volume data from the GNSS chip. The second GNSS observation volume data may include a pseudorange observation volume, a Doppler frequency observation volume, and the like.

S810: The electronic device 100 may solve common positioning coordinates based on the second GNSS observation volume data.

In a possible implementation, the electronic device 100 may measure inertial measurement data of the electronic device 100 by using an inertial measurement unit (IMU). The inertial measurement data includes acceleration sensor data, gyro sensor data, and the like. The electronic device 100 may perform inertial navigation based on the second GNSS observation volume data and the inertial measurement data, to obtain the common positioning coordinates.

A positioning precision value of the common positioning coordinates is greater than a positioning precision value of the high-precision positioning coordinates. A smaller positioning precision value indicates a more accurate positioning result.

S811: The electronic device 100 may report the common positioning coordinates to the upper-layer application.

The upper-layer application can perform a service such as positioning and navigation based on the common positioning coordinates and the map resource package.

In some embodiments, the electronic device 100 may include a positioning engine. The positioning engine may include a common positioning function and a high-precision positioning function. When determining that the upper-layer application is a high-precision application, the electronic device 100 may enable the high-precision positioning function of the positioning engine, and solve the high-precision positioning coordinates in the first coordinate system by using the positioning engine based on the first GNSS observation volume data and the positioning assistance data. The electronic device 100 may add the deflection factor to the high-precision positioning coordinates, and then encrypt and report the high-precision positioning coordinates to the upper-layer application.

When the electronic device 100 determines that the upper-layer application is a low-precision application, the electronic device 100 may enable the common positioning function of the positioning engine, and stop obtaining the positioning assistance data. The electronic device 100 may solve the common positioning coordinates in the first coordinate system based on the second GNSS observation volume data by using the positioning engine. The electronic device 100 may report the common positioning coordinates to the upper-layer application. A positioning precision value of the common positioning coordinates is less than a positioning precision value of the high-precision positioning coordinates. A smaller positioning precision value indicates a more accurate positioning result.

For related content that the electronic device 100 includes only one positioning engine, refer to the embodiment shown in FIG. 6. Details are not described herein again.

In some embodiments, the electronic device 100 may include a common positioning engine and a high-precision positioning engine. When determining that the upper-layer application is a high-precision application, the electronic device 100 may solve the high-precision positioning coordinates in the first coordinate system by using the high-precision positioning engine based on the first GNSS observation volume data and the positioning assistance data. The electronic device 100 may add the deflection factor to the high-precision positioning coordinates, and then encrypt and report the high-precision positioning coordinates to the upper-layer application.

When determining that the upper-layer application is a low-precision application, the electronic device 100 may solve the common positioning coordinates in the first coordinate system by using the common positioning engine based on the second GNSS observation volume data. The electronic device 100 may report the common positioning coordinates to the upper-layer application. A positioning precision value of the common positioning coordinates is less than a positioning precision value of the high-precision positioning coordinates. A smaller positioning precision value indicates a more accurate positioning result.

For related content that the electronic device 100 includes the common positioning engine and the high-precision positioning engine, refer to the embodiment shown in FIG. 7. Details are not described herein again.

In the positioning method provided in this embodiment of this application, a sub-meter-level (<1 m) high-precision positioning service can be implemented in the electronic device 100 by using a GNSS high-precision positioning technology alone or in combination with an inertial navigation technology. This can implement a high-precision application such as the lane-level navigation. In addition, two services, namely a common positioning service and a high-precision positioning service, are simultaneously provided through permission control and an independent channel design. The electronic device 100 may perform coordinate conversion and encryption processing in a process of reporting the high-precision positioning result. This can ensure that a reporting channel for the common positioning result is isolated from a reporting channel for the high-precision positioning result and ensure output security of the high-precision positioning result, satisfying security requirements on the positioning result of policies, laws and regulations of different.

The following describes a schematic flowchart of another positioning method according to an embodiment of this application.

In some application scenarios, an electronic device 100 may include one positioning engine. The electronic device 100 may include a high-precision application and a common application. The high-precision application may obtain a positioning result with a high precision (for example, a typical precision value of less than 1 m). The common application needs to obtain only a positioning result with a common precision (for example, a typical precision value of 3 m to 5 m). When the electronic device 100 simultaneously obtains positioning instructions of the common application and the high-precision application (to be specific, a time interval between obtaining the positioning instruction of the high-precision application and the positioning instruction of the common application is less than a preset time threshold (for example, 1 second)), the electronic device 100 may first enable a high-precision positioning function of the positioning engine, to solve high-precision positioning coordinates. The electronic device 100 adds a deflection factor to the high-precision positioning coordinates, and then encrypts and reports the high-precision positioning coordinates to the high-precision application. The electronic device 100 may add a random error to the high-precision positioning coordinates, to reduce a positioning precision value, and then report the high-precision positioning coordinates to the common application. This can improve output security of a high-precision positioning result, satisfying security requirements of different countries or regions.

Figure 9:
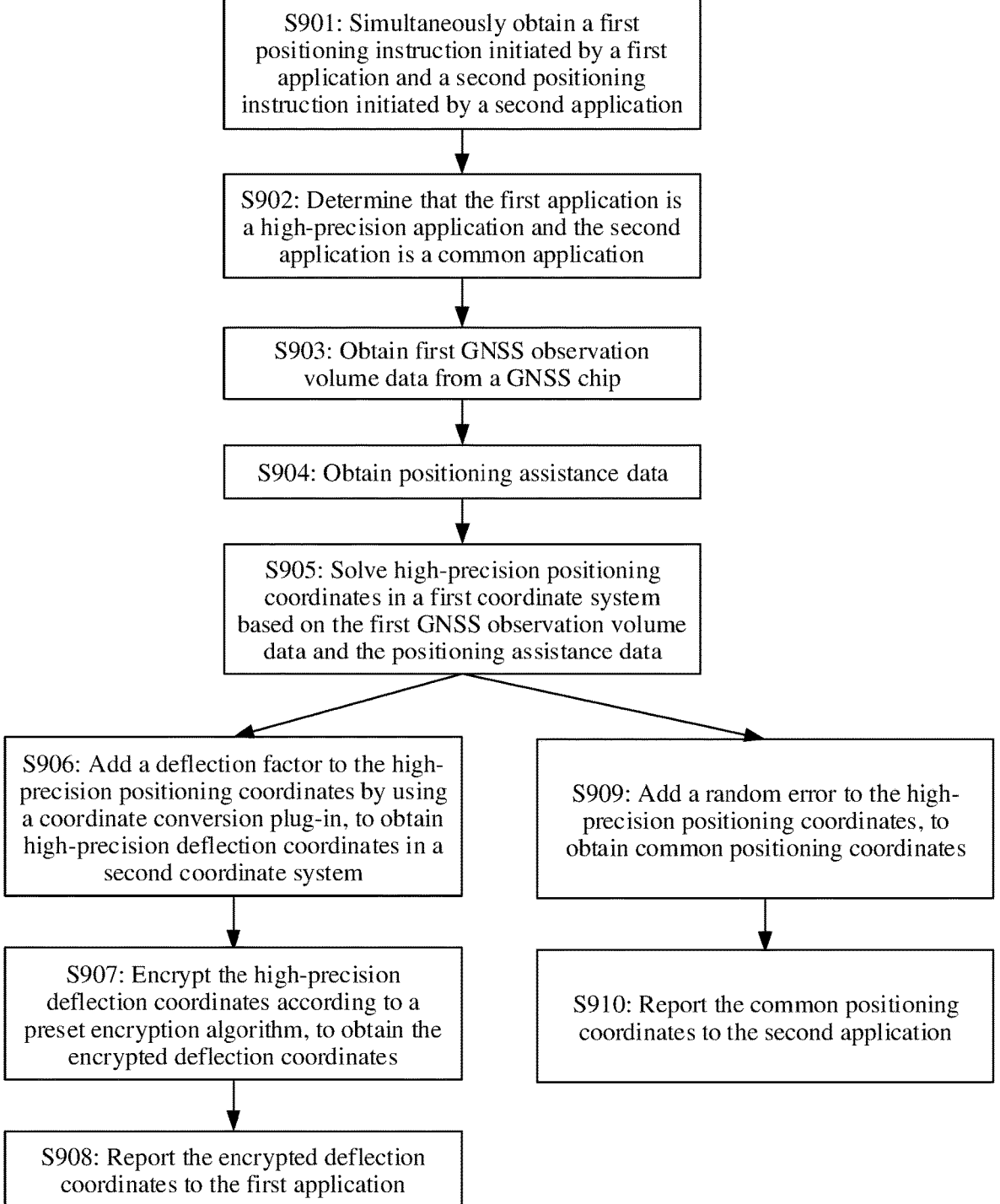
FIG. 9 is a schematic flowchart of another positioning method according to an embodiment of this application.

FIG. 9 is a schematic flowchart of a positioning method according to an embodiment of this application.

As shown in FIG. 9, the method may include the following steps.

S901: An electronic device 100 may simultaneously obtain a first positioning instruction initiated by a first application and a second positioning instruction initiated by a second application.

S902: The electronic device 100 may determine that the first application is a high-precision application and the second application is a common application.

When the electronic device 100 detects that a time interval between a time point of obtaining the first positioning instruction and a time point of obtaining the second positioning instruction is less than preset duration (for example, 1 second), the electronic device 100 may determine that the electronic device 100 simultaneously obtains the first positioning instruction and the second positioning instruction.

When obtaining the first positioning instruction of the first application, the electronic device 100 may authenticate the first application by using an authentication server. Specifically, after obtaining the first positioning instruction, the electronic device 100 may send a first authentication request to the authentication server. The first authentication request includes an identifier of the first application. The authentication server may check whether a stored high-precision application whitelist includes the identifier of the first application. If the stored high-precision application whitelist includes the identifier of the first application, the authentication server may return first authentication success information to the electronic device 100. The first authentication success information may indicate that the first application is a high-precision application. The high-precision application whitelist includes identifiers of a plurality of high-precision applications. After receiving the first authentication success information sent by the authentication server, the electronic device 100 may determine that the upper-layer application is a high-precision application.

When obtaining the second positioning instruction of the second application, the electronic device 100 may authenticate the second application by using the authentication server. Specifically: after obtaining the second positioning instruction, the electronic device 100 may send a second authentication request to the authentication server. The second authentication request includes an identifier of the second application. The authentication server may check whether a stored high-precision application whitelist includes the identifier of the second application. If the stored high-precision application whitelist does not include the identifier of the second application, the authentication server may return first authentication failure information to the electronic device 100. The first authentication failure information may indicate that the second application is a common application. The high-precision application whitelist includes identifiers of a plurality of high-precision applications. After receiving the first authentication failure information sent by the authentication server, the electronic device 100 may determine that the second application is a high-precision application.

In a possible implementation, the high-precision application whitelist may be stored in the electronic device 100. The electronic device 100 may determine whether the high-precision application whitelist includes the identifier of the first application. If the high-precision application whitelist includes the identifier of the first application, the electronic device 100 may determine that the first application is a high-precision application. The electronic device 100 may determine whether the high-precision application whitelist includes the identifier of the second application. If the high-precision application whitelist does not include the identifier of the second application, the electronic device 100 may determine that the second application is a high-precision application.

Specifically, for descriptions of the high-precision application and the common application, refer to step S801 in the embodiment shown in FIG. 8. Details are not described herein again.

S903: The electronic device 100 may obtain first GNSS observation volume data from a GNSS chip.

For details, refer to step S803 in the embodiment shown in FIG. 8. Details are not described herein again.

S904: The electronic device 100 may obtain positioning assistance data.

For details, refer to step S804 in the embodiment shown in FIG. 8.

S905: The electronic device 100 may solve high-precision positioning coordinates in a first coordinate system based on the first GNSS observation volume data and the positioning assistance data.

The electronic device 100 may include only one positioning engine. The positioning engine may include a high-precision positioning function and a low-precision positioning function. When the electronic device 100 simultaneously receives the first positioning instruction and the second positioning instruction, the electronic device 100 may enable the high-precision positioning function of the positioning engine.

For a specific process in which the positioning engine solves the high-precision positioning function, refer to step S805 in the embodiment shown in FIG. 8. Details are not described herein again.

After solving the high-precision positioning coordinates, the electronic device 100 may perform step S906 to step S908, and simultaneously perform step S909 to step S910.

S906: The electronic device 100 may add a deflection factor to the high-precision positioning coordinates by using a coordinate conversion plug-in, to obtain high-precision deflection coordinates in a second coordinate system.

For details, refer to step S806 in the embodiment shown in FIG. 8. Details are not described herein again.

S907: The electronic device 100 may encrypt the high-precision deflection coordinates according to a preset encryption algorithm, to obtain the encrypted deflection coordinates.

For details, refer to step S807 in the embodiment shown in FIG. 8. Details are not described herein again.

S908: The electronic device 100 may report the encrypted deflection coordinates to the first application.

For details, refer to step S808 in the embodiment shown in FIG. 8. Details are not described herein again.

S909: The electronic device 100 may add a random error to the high-precision positioning coordinates, to obtain common positioning coordinates.

The electronic device 100 may generate a random error value according to a random algorithm, and add the random error value to the high-precision positioning coordinates, to obtain the common positioning coordinates.

For example, the high-precision positioning coordinates solved by the electronic device 100 may be "latitude: 22.533867387389293, and longitude: 113.918884573070101" in the WGS84 coordinate system. The random error value generated by the electronic device 100 according to the random algorithm may include "a latitude error: 0.000000056, and a longitude error: 0.000000023". The electronic device 100 adds the latitude error value in the random error value to the latitude value of the high-precision positioning coordinates, and adds the longitude error value in the random error value to the longitude value of the high-precision positioning coordinates, to obtain the common positioning coordinates. The common positioning coordinates may be "latitude: 22.533867443389293", and longitude: 113.918884596070101".

S910: The electronic device 100 may report the common positioning coordinates to the second application.

The second application can perform a service such as positioning and navigation based on the common positioning coordinates and the map resource package.

With reference to an application scenario, the following describes a positioning method provided in an embodiment of this application.

In some application scenarios, an electronic device 100 may include a map application. The map application may be a high-precision application. After receiving a navigation operation performed by a user on a navigation application, the electronic device 100 may obtain first GNSS observation volume data and positioning assistance data, and solve high-precision positioning coordinates based on the first GNSS observation volume data and the positioning assistance data. The electronic device 100 may add a deflection factor to the high-precision positioning coordinates, obtain the encrypted high-precision deflection coordinates through encryption, and then report the encrypted high-precision deflection coordinates to the map application. The map application may decrypt the high-precision deflection coordinates, and complete a service such as lane-level navigation.

Figure 10A:
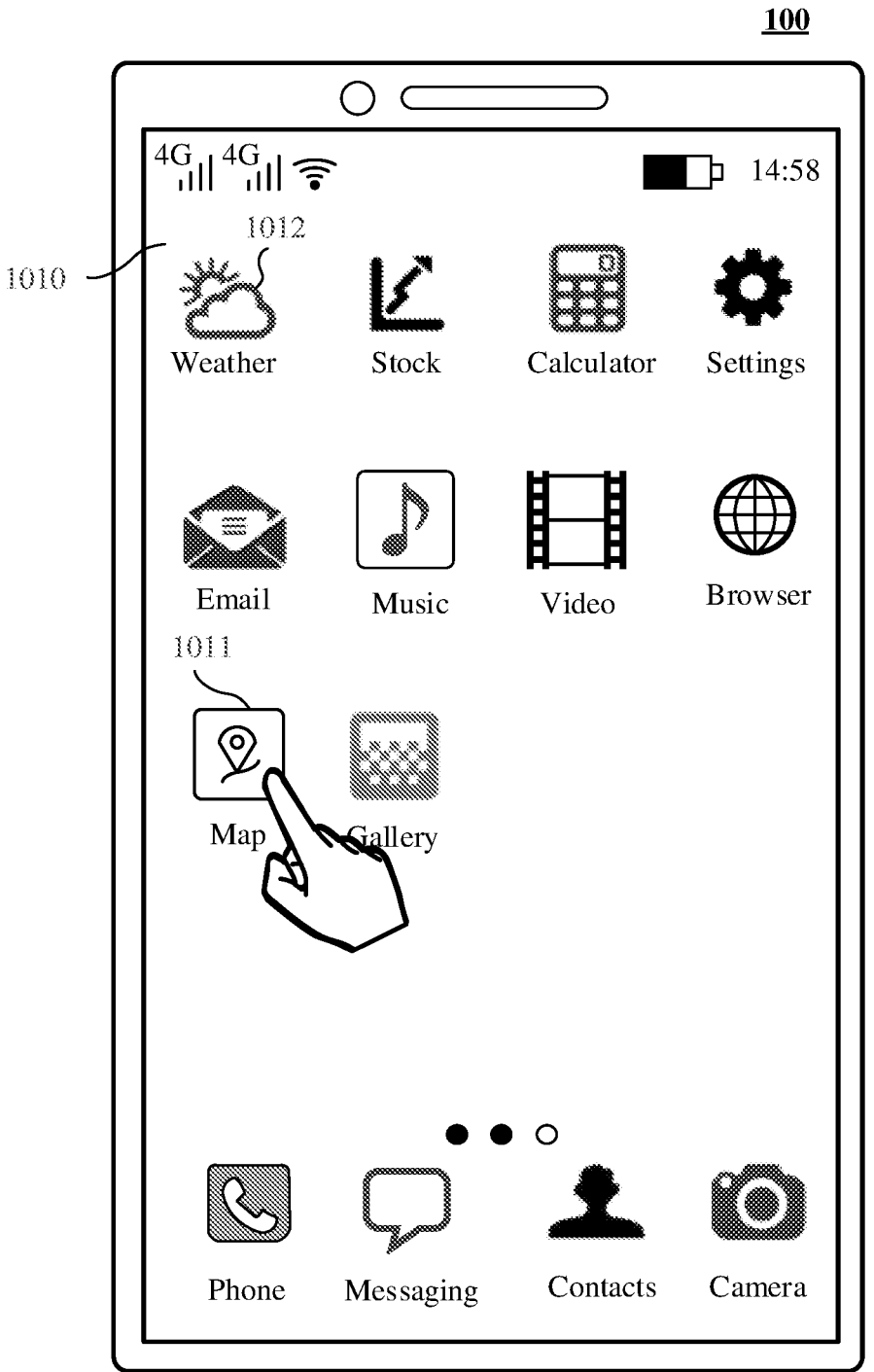
FIG. 10A to FIG. 10E are schematic diagrams of a group of lane-level navigation interfaces of a high-precision application according to an embodiment of this application.

For example, as shown in FIG. 10A, an electronic device 100 may display an interface 1010 of a home screen (home screen). The interface 1010 displays a page with application icons. The page includes a plurality of application icons (for example, a weather application icon, a stock application icon, a calculator application icon, a settings application icon, an email application icon, a music application icon, a video application icon, a browser application icon, a map application icon 1011, a gallery application icon, a notepad application icon, and a voice assistant application icon). Optionally, a page indicator is further displayed below the plurality of application icons, to indicate a total quantity of pages on the home screen and a position relationship between a currently displayed page and another page. For example, the interface 1010 of the home screen may include three pages, and a white dot in the page indicator may indicate that the currently displayed page is a rightmost page of the three pages. Further, optionally, there are a plurality of tray icons (for example, a phone application icon, a messaging application icon, a contacts application icon, and a camera application icon) below the page indicator. The tray icons remain displayed during page switching.

Figure 10B:
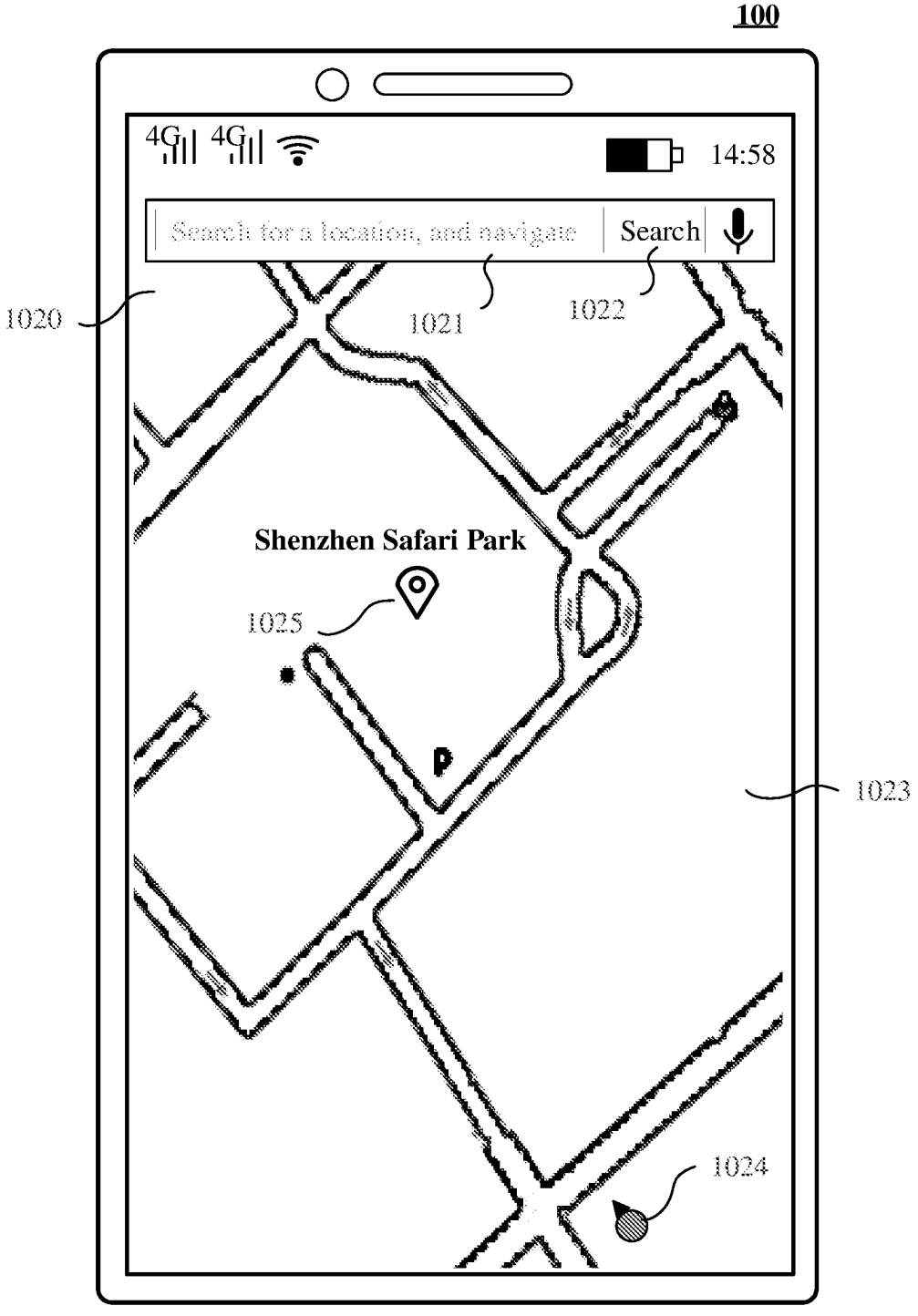

The electronic device 100 may receive an input operation (for example, a tap operation) performed by a user on a map application icon 1011, and display a map application interface 1020 shown in FIG. 10B in response to the input operation.

As shown in FIG. 10B, the map application interface 1020 may include an address search input box 1021, a search control 1022, a map 1023, and a location mark 1024 of the electronic device 100 in the map 1023. The address search input box 1021 may be used to receive an address name input by the user. The search control 1022 may be used to trigger the electronic device 100 to display location information corresponding to the address name input by the user.

The electronic device 100 may receive the address name (for example, "Shenzhen Safari Park") input by the user in the address search input box 1021. Then, the electronic device 100 may receive an input operation (for example, click) of the user on the search control 1022. In response to the input operation, the electronic device 100 may display, on the map 1023, a location mark corresponding to the address name and location information corresponding to the address name.

Figure 10C:
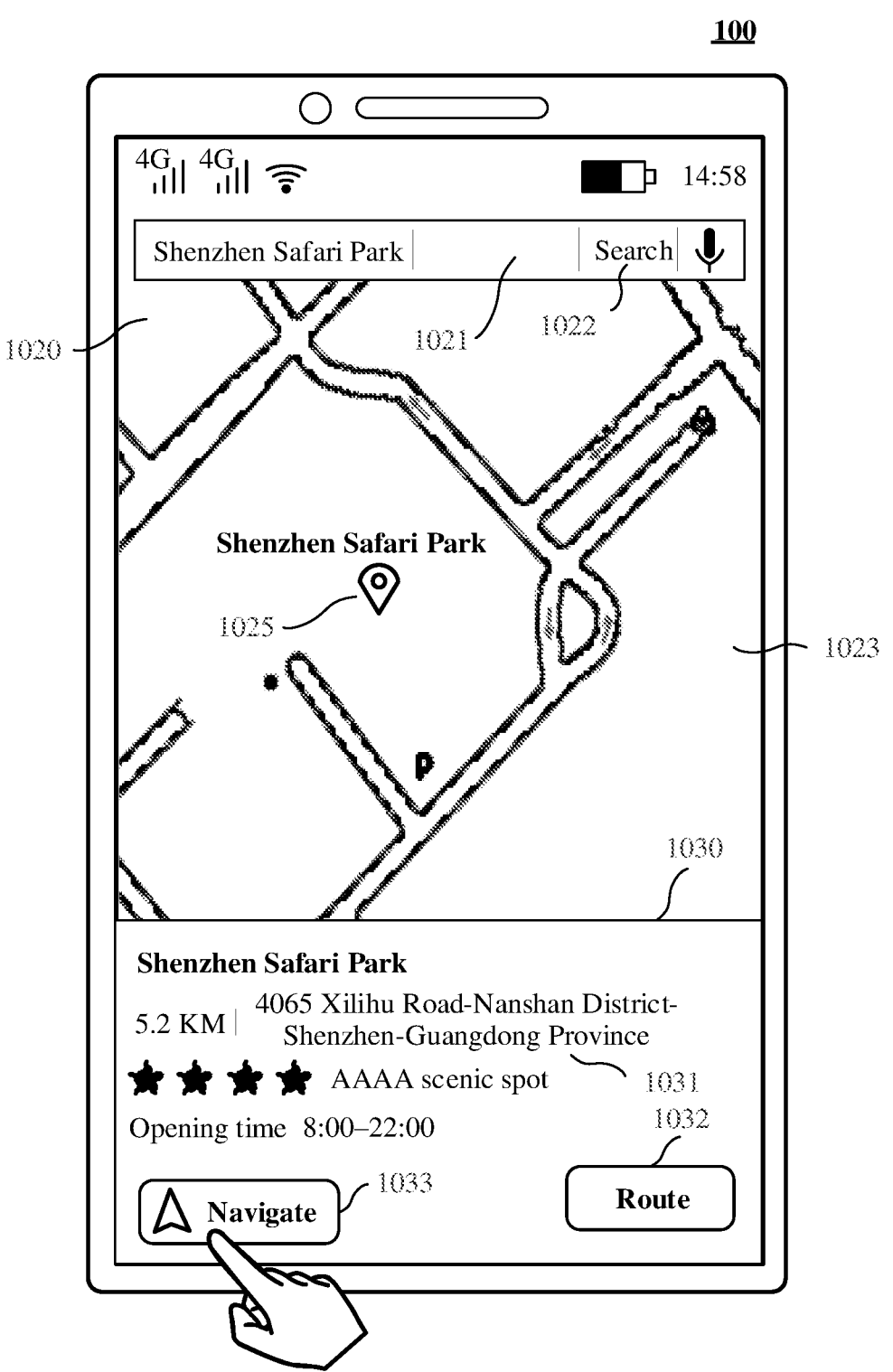

Specifically, as shown in FIG. 10C, after the electronic device 100 receives an address name (for example, "Shenzhen Safari Park") input by the user and searches for location information corresponding to the address name, the electronic device 100 may display a location mark 1025 corresponding to the address name and a details page 1030 corresponding to the address name on the map 1023. The details page 1030 of the address name includes location information 1031 (for example, "4065 Xilihu Road-Nanshan District-Shenzhen-Guangdong Province") corresponding to the address name, a route control 1032, a navigation control 1033, and the like. The route control 1032 may be configured to trigger the electronic device 100 to display information about a route from a location of the electronic device 100 to a location corresponding to the address name. The navigation control 1033 may be configured to trigger the electronic device 100 to display information about navigation from the location of the electronic device 100 to the address name.

Figure 10D:
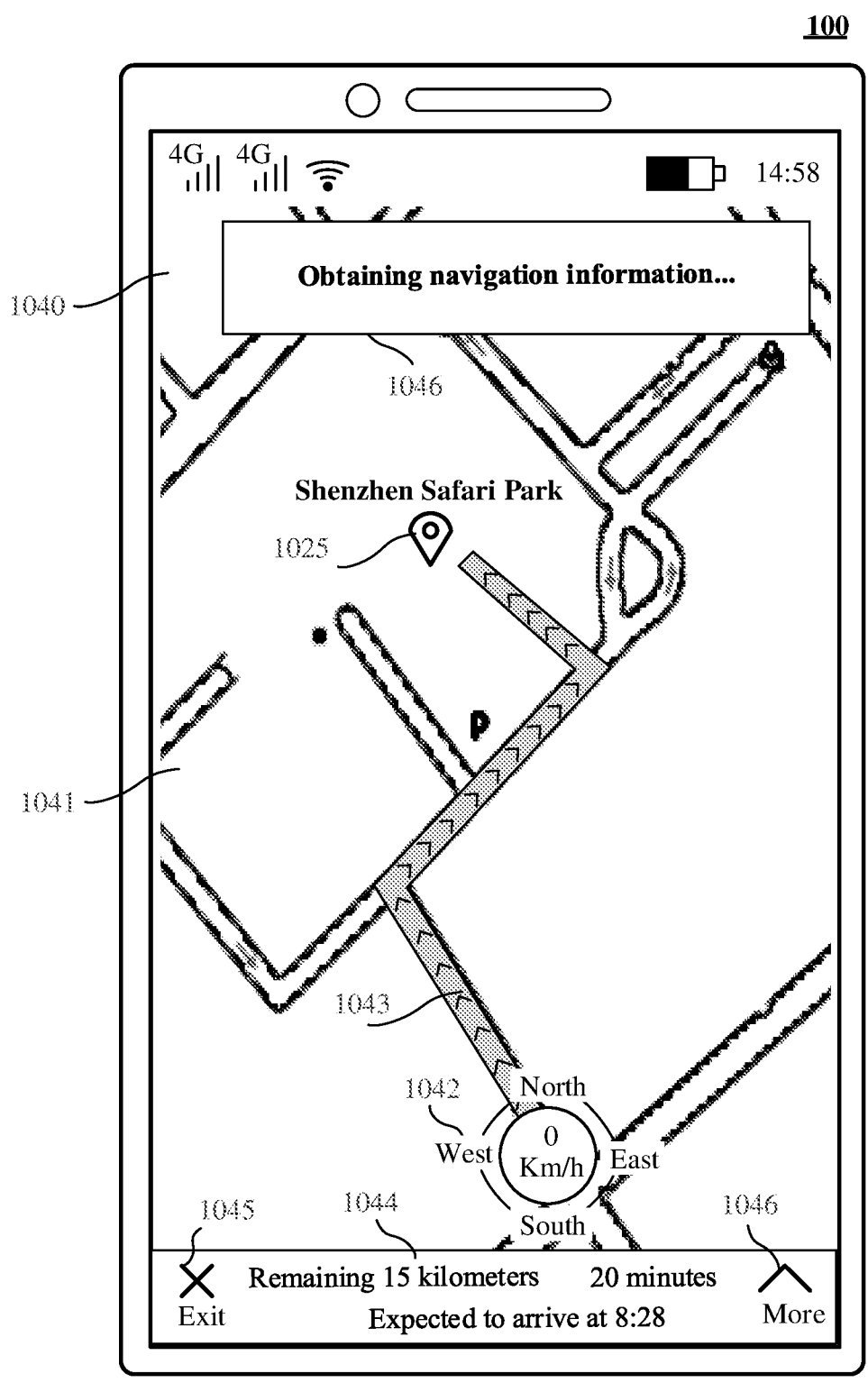

The electronic device 100 may receive an input operation (for example, a tap operation) performed by the user on the navigation control 1033, and display a navigation interface 1040 shown in FIG. 10D in response to the input operation. The electronic device 100 may further obtain first GNSS observation volume information by using a GNSS chip in response to the input operation on the navigation control 1033, and obtain positioning assistance data sent by a server 200 or broadcast from a base station or a satellite. The electronic device 100 may determine high-precision positioning coordinates based on the first GNSS observation volume information and the positioning assistance data. The electronic device 100 may add a deflection factor to the high-precision positioning coordinates, obtain encrypted high-precision deflection coordinates through encryption, and then report the encrypted high-precision deflection coordinates to the map application. The electronic device 100 may determine, based on the high-precision deflection coordinates and a map resource package, the navigation information displayed on the navigation interface 1040. The navigation information includes route information, speed information of the electronic device 100, lane information, and the like.

As shown in FIG. 10D, the navigation interface 1040 may include a map 1041, a location mark 1042, a location mark 1025, a route 1043, distance and time information 1044, an exit control 1045, a more control 1046, and the like. The location mark 1042 indicates a location of the electronic device 100 on the map 1041. The location mark 1042 may display speed information (for example, "0 km/h" at present) of the electronic device 100. The location mark 1025 may indicate a location of a destination (for example, "Shenzhen Safari Park") in the map 1041. The route 1043 may indicate information about a route from the location of the electronic device 100 to a destination. The distance and time information 1044 indicates a distance (for example, "Remaining 15 kilometers") from the electronic device 100 to the destination and estimated time (for example, "Expected to arrive at 8:28") of arrival of the destination. The exit control 13456 may be used to trigger the electronic device 100 to end navigation. The more control 1346 may be configured to trigger the electronic device 100 to display more navigation-related function controls. The electronic device 100 may further display prompt information 1046 on the navigation interface 1340. The prompt information 1046 prompts the user that the electronic device 100 is determining navigation information to be displayed on the navigation interface 1040).

Figure 10E:
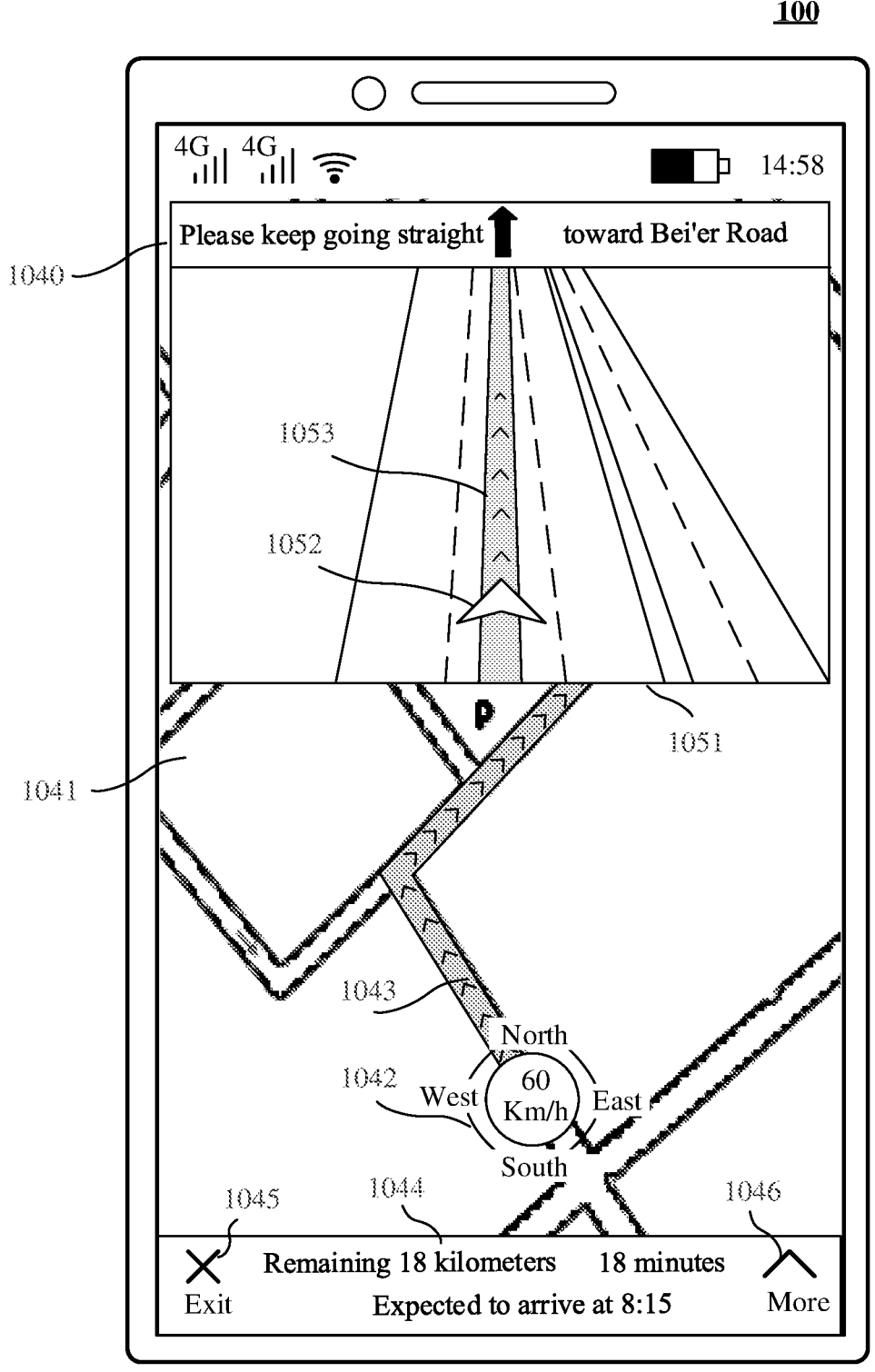

As shown in FIG. 10E, after determining the navigation information, the electronic device 100 may display a navigation prompt box 1051 on the navigation interface 1040. The navigation prompt box 1051 displays the navigation information. The navigation information includes a lane 1052 in which the electronic device 100 is located, lane route information 1053, and a driving direction (for example, "Please keep going straight toward Bei'er Road").

The foregoing example is only used to explain this application and should not be construed as a limitation.

Figure 11:
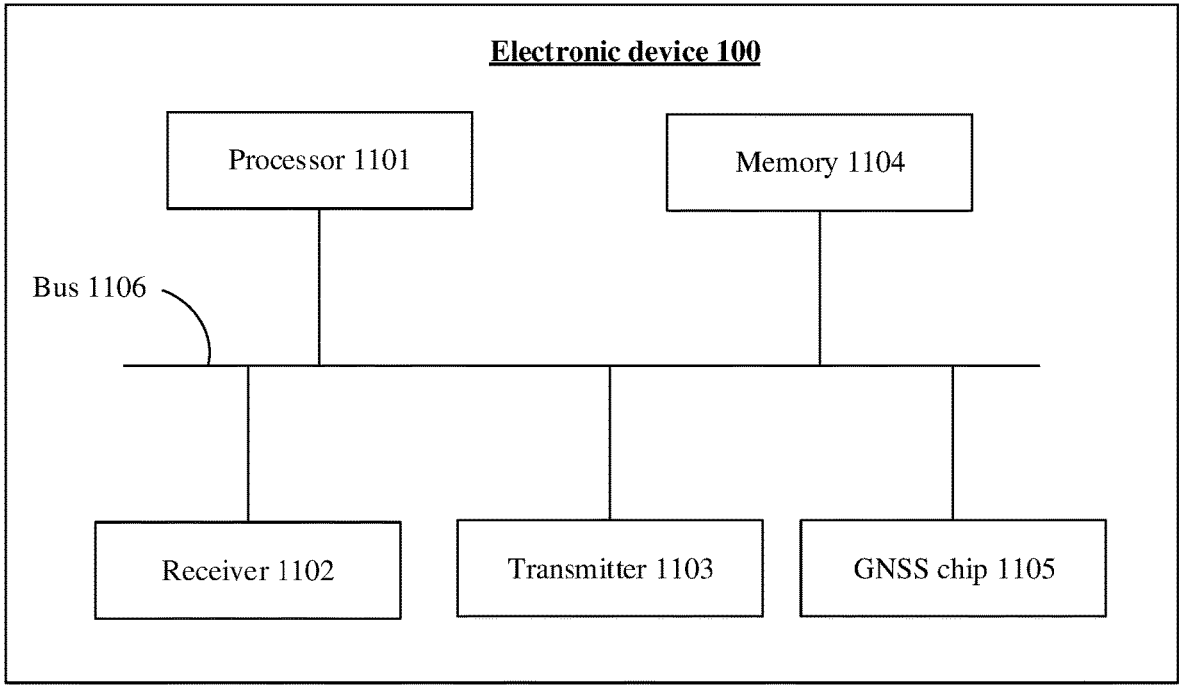
FIG. 11 is another schematic diagram of a structure of an electronic device according to an embodiment of this application.

FIG. 11 is another schematic diagram of a structure of an electronic device 100 according to an embodiment of this application.

As shown in FIG. 11, the electronic device 100 includes: a processor 1101, a receiver 1102, a transmitter 1103, a memory 1104, a GNSS chip 1105, and a bus 1106. The processor 1101 includes one or more processing cores. The processor 1101 runs a software program and a module, to perform various function applications and process information. The receiver 1102 and the transmitter 1103 may be implemented as a communications component, and the communications component may be a baseband chip. The memory 1104 is connected to the processor 1101 by using the bus 1106. The memory 1104 may be configured to store at least one program instruction. The processor 1101 is configured to execute the at least one program instruction, to implement the technical solution in the foregoing embodiment. Implementation principles and technical effects thereof are similar to those of the foregoing method embodiments. Details are not described herein again.

In some embodiments, the electronic device 100 may further include an inertial measurement unit (not shown in FIG. 11). For description of the inertial measurement unit, refer to the foregoing embodiments. Details are not described herein again.

In this embodiment of this application, the processor 1101 may be a general purpose processor, a digital signal processor, an application-specific integrated circuit, a field programmable gate array or another programmable logical device, a discrete gate or transistor logic device, or a discrete hardware component, and may implement or perform the method, steps, and logical block diagrams disclosed in embodiments of this application. The general purpose processor may be a microprocessor or any conventional processor or the like. The steps of the method disclosed with reference to embodiments of this application may be directly performed by a hardware processor, or may be performed by using a combination of hardware in the processor and a software module.

In this embodiment of this application, the memory 1104 may be a non-volatile memory, for example, a hard disk drive (hard disk drive, HDD) or a solid-state drive (solid-state drive, SS), or may be a volatile memory (volatile memory), for example, a random-access memory (random-access memory, RAM). The memory is any other medium that can carry or store expected program code in a form of an instruction or a data structure and that can be accessed by a computer, but is not limited thereto.

The memory 1104 in this embodiment of this application may also be a circuit or any other apparatus capable of implementing a storage function, and is configured to store program instructions and/or data. All or some of the methods provided in embodiments of this application may be performed by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on the computer, the process or functions according to embodiments of this application are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired manner (for example, a coaxial cable, an optical fiber, or a digital subscriber line (Digital Subscriber Line, DSL)) or a wireless manner (for example, infrared, radio, and microwave). The computer-readable storage medium may be any usable medium accessible by the computer, or a data storage device such as a server or a data center, integrating one or more usable media. The usable medium may be a magnetic medium (for example, a floppy disk, a hard disk drive, or a magnetic tape), an optical medium (for example, a digital video disc (digital video disc, DVD)), a semiconductor medium (for example, an SSD), or the like.

In conclusion, the foregoing embodiments are only intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A positioning method, comprising:

obtaining, by an electronic device, a first positioning instruction of a first application:

solving, by the electronic device, high-precision positioning coordinates in a first coordinate system in accordance with the first positioning instruction:

adding, by the electronic device, a deflection factor to the high-precision positioning coordinates and performing encryption according to a preset encryption algorithm to obtain encrypted deflection coordinates; and reporting, by the electronic device, the encrypted deflection coordinates to the first application;

obtaining, by the electronic device, a second positioning instruction of a second application;

solving, by the electronic device, common positioning coordinates in the first coordinate system in accordance with the second positioning instruction;

reporting, by the electronic device, the common positioning coordinates to the second application;

decrypting, by the electronic device, the encrypted deflection coordinates using a decryption key included in the first application and that corresponds to the preset encryption algorithm, to obtain the high-precision deflection coordinates; and performing, by the electronic device, lane-level navigation using a map resource package provided in the first application and the high-precision deflection coordinates, wherein location coordinates in the map resource package are obtained by adding the deflection factor to real location coordinates.

2. The method according to claim 1, wherein the solving, by the electronic device, high-precision positioning coordinates in a first coordinate system comprises:

obtaining, by the electronic device, first global navigation satellite system (GNSS) observation volume data from a global navigation satellite system GNSS chip:

obtaining, by the electronic device, positioning assistance data; and solving, by the electronic device, the high-precision positioning coordinates in the first coordinate system based on the first GNSS observation volume data and the positioning assistance data.

3. The method according to claim 2, wherein the obtaining, by the electronic device, first GNSS observation volume data by using a GNSS chip comprises:

authenticating, by the electronic device, the first application, and after the first application is successfully authenticated, obtaining, by the electronic device, the first GNSS observation volume data from the GNSS chip.

4. The method according to claim 3, wherein the authenticating, by the electronic device, the first application comprises:

sending, by the electronic device, an authentication request to an authentication server, the authentication request comprising an identifier of the first application; and authenticating the first application following receipt by the electronic device of authentication success information sent by the authentication server.

5. The method according to claim 3, wherein the authenticating, by the electronic device, the first application comprises:

determining, by the electronic device, whether a high-precision application whitelist comprises an identifier of the first application, and when the high-precision application whitelist comprises the identifier of the first application, successfully authenticating the first application, the high-precision application whitelist comprising an identifier of one or more high-precision applications.

6. The method according to claim 2, wherein the first GNSS observation volume data comprises a carrier phase observation volume and one or more of a pseudorange observation volume and a Doppler frequency observation volume, the method further comprising:

obtaining, by the electronic device, a probability location based on the first GNSS observation volume data; and sending, by the electronic device, the probability location to a server:

the obtaining, by the electronic device, positioning assistance data comprising:

obtaining, by the electronic device, the positioning assistance data that is determined by the server based on the probability location, location information and observation volume data obtained during satellite observation by N reference stations, wherein the positioning assistance data comprises the observation volume data and the location information of the reference station, N being a positive integer; and the solving, by the electronic device, the high-precision positioning coordinates in the first coordinate system based on the first GNSS observation volume data and the positioning assistance data comprises:

solving, by the electronic device, the high-precision positioning coordinates in the first coordinate system through real-time kinematic RTK positioning based on the first GNSS observation volume data and the positioning assistance data.

7. The method according to claim 2, wherein the first GNSS observation volume data comprises a carrier phase observation volume and one or more of a pseudorange observation volume and a Doppler frequency observation volume:

the obtaining, by the electronic device, positioning assistance data comprises:

receiving, by the electronic device, the positioning assistance data from a mobile communications base station or a satellite, wherein the positioning assistance data comprises one or more of a precise ephemeris, ephemeris correction data, and an atmospheric correction quantity; and the solving, by the electronic device, the high-precision positioning coordinates in the first coordinate system based on the first GNSS observation volume data and the positioning assistance data comprises:

solving, by the electronic device, the high-precision positioning coordinates in the first coordinate system through precise point positioning PPP based on the first GNSS observation volume data and the positioning assistance data.

8. The method according to claim 2, further comprising:

obtaining, by the electronic device, inertial measurement data from an inertial measurement unit, the inertial measurement data comprising acceleration sensor data and gyro sensor data of the electronic device; and the solving, by the electronic device, the high-precision positioning coordinates in the first coordinate system based on the first GNSS observation volume data and the positioning assistance data comprises:

performing, by the electronic device, inertial navigation based on the first GNSS observation volume data, the positioning assistance data, and the inertial measurement data to solve the high-precision positioning coordinates in the first coordinate system.

9. The method according to claim 1, wherein the adding, by the electronic device, a deflection factor to the high-precision positioning coordinates and performing encryption according to a preset encryption algorithm to obtain encrypted deflection coordinates comprises:

adding, by the electronic device, the deflection factor to the high-precision positioning coordinates to obtain high-precision deflection coordinates in a second coordinate system; and encrypting, by the electronic device, the high-precision deflection coordinates according to a preset encryption algorithm to obtain the encrypted deflection coordinates.

10. The method according to claim 1, wherein the solving, by the electronic device, common positioning coordinates in the first coordinate system comprises:

obtaining, by the electronic device, second GNSS observation volume data from the GNSS chip; and solving, by the electronic device, the common positioning coordinates in the first coordinate system based on the second GNSS observation volume data.

11. The method according to claim 1, wherein the second GNSS observation volume data comprises one or more of a pseudorange observation volume and a Doppler frequency observation volume.

12. The method according to claim 1, further comprising:

obtaining, by the electronic device, inertial measurement data from an inertial measurement unit, the inertial measurement data comprising acceleration sensor data and gyro sensor data of the electronic device; and the solving, by the electronic device, the common positioning coordinates in the first coordinate system based on the second GNSS observation volume data comprises:

performing, by the electronic device, inertial navigation based on the second GNSS observation volume data and the inertial measurement data to solve the common positioning coordinates in the first coordinate system.

13. The method according to claim 1, further comprising:

a high-precision positioning engine and a common positioning engine, wherein the solving, by the electronic device, high-precision positioning coordinates in a first coordinate system comprises:

solving, by the electronic device, the high-precision positioning coordinates in the first coordinate system by using the high-precision positioning engine; and the solving, by the electronic device, common positioning coordinates in the first coordinate system comprises:

solving, by the electronic device, the common positioning coordinates in the first coordinate system by using the common positioning engine.

14. The method according to claim 1, wherein:

the electronic device comprises a positioning engine comprising a high-precision positioning function and a common positioning function:

the solving, by the electronic device, high-precision positioning coordinates in a first coordinate system comprises:

enabling, by the electronic device, the high-precision positioning function of the positioning engine and solving the high-precision positioning coordinates in the first coordinate system by using the positioning engine; and the method further comprises:

obtaining, by the electronic device, a second positioning instruction of a second application:

adding, by the electronic device, a random error to the high-precision positioning coordinates, to obtain common positioning coordinates when a time difference between a time point of obtaining the first positioning instruction and a time point of obtaining the second positioning instruction is less than preset duration, wherein a precision value of the common positioning coordinates is greater than a precision value of the high-precision positioning coordinates; and reporting, by the electronic device, the common positioning coordinates to the second application.

15. The method according to claim 14, further comprising:

enabling, by the electronic device, the common positioning function of the positioning engine when a time difference between the time point of obtaining the first positioning instruction and the time point of obtaining the second positioning instruction is greater than or equal to the preset duration, and obtaining second GNSS observation volume data from the GNSS chip; and solving, by the electronic device, the common positioning coordinates using the positioning engine based on the second GNSS observation volume data.

16. The method according to claim 14, further comprising:

determining, by the electronic device, the positioning precision value of the high-precision positioning coordinates; and when the time difference between the time point of obtaining the first positioning instruction and the time point of obtaining the second positioning instruction is less than the preset duration and the positioning precision value of the high-precision positioning coordinates is less than a preset precision value, adding, by the electronic device, the random error to the high-precision positioning coordinates to obtain the common positioning coordinates, wherein the precision value of the common positioning coordinates is greater than the precision value of the high-precision positioning coordinates; or when the time difference between the time point of obtaining the first positioning instruction and the time point of obtaining the second positioning instruction is less than the preset duration and the positioning precision value of the high-precision positioning coordinates is greater than or equal to the preset precision value, determining, by the electronic device, the high-precision positioning coordinates as the common positioning coordinates.

17. The method according to claim 1, wherein the first coordinate system is a world geodetic system WGS84 coordinate system, and the second coordinate system is one of a GCJ02 coordinate system or a BD09 coordinate system.

18. The method according to claim 1, wherein the preset encryption algorithm comprises an SM4 encryption algorithm.

* * * * *